United States Patent
Govindaraju et al.

(10) Patent No.: US 10,212,261 B2
(45) Date of Patent: Feb. 19, 2019

(54) NETWORK CONNECTIVITY FOR CONSTRAINED WIRELESS SENSOR NODES

(71) Applicant: ANALOG DEVICES GLOBAL, Hamilton (BM)

(72) Inventors: Prakash Govindaraju, Karnatka (IN); Hans Waldmann, Norwood, MA (US); Shankar S. Malladi, Walpole, MA (US)

(73) Assignee: ANALOG DEVICES GLOBAL, Hamilton (BM)

(*) Notice: Subject to any disclaimer, the term of this patent is extended or adjusted under 35 U.S.C. 154(b) by 302 days.

(21) Appl. No.: 15/095,004

(22) Filed: Apr. 8, 2016

(65) Prior Publication Data
US 2017/0295503 A1    Oct. 12, 2017

(51) Int. Cl.
| | |
|---|---|
| H04W 24/02 | (2009.01) |
| H04L 29/06 | (2006.01) |
| H04L 29/08 | (2006.01) |
| H04W 40/00 | (2009.01) |
| H04W 4/38 | (2018.01) |
| H04W 80/04 | (2009.01) |

(52) U.S. Cl.
CPC .......... H04L 69/22 (2013.01); H04L 67/12 (2013.01); H04L 69/329 (2013.01); H04W 4/38 (2018.02); H04W 40/00 (2013.01); H04W 80/04 (2013.01)

(58) Field of Classification Search
None
See application file for complete search history.

(56) References Cited

U.S. PATENT DOCUMENTS

| | | | |
|---|---|---|---|
| 8,102,787 B2 | 1/2012 | Wang et al. | |
| 8,139,589 B2 | 3/2012 | Choi et al. | |
| 8,195,814 B2 | 6/2012 | Shelby | |
| 8,244,260 B2 | 8/2012 | Silverstrim et al. | |
| 8,547,906 B2 | 10/2013 | Budampati et al. | |

(Continued)

FOREIGN PATENT DOCUMENTS

| | | |
|---|---|---|
| EP | 2725763 | 4/2014 |
| EP | 2543216 | 9/2014 |

OTHER PUBLICATIONS

Thomas Zachariah et al., *The Internet of Things Has a Gateway Problem*, Electrical Engineering and Computer Science Department, University of Michigan, Ann Arbor, MI, USA, *HotMobile '15*, Feb. 12-13, 2015, Santa Fe, New Mexico ACM 978-1-4503-3391-7/15/02, 6 pages.

(Continued)

*Primary Examiner* — Ayaz R Sheikh
*Assistant Examiner* — Sori A Aga
(74) *Attorney, Agent, or Firm* — Patent Capital Group

(57) ABSTRACT

Wireless sensor nodes for enabling network connectivity in a wireless sensor network system are disclosed herein. An exemplary method includes receiving a Lightweight Machine-to-Machine (LWM2M) network packet from a network node over a network; using a media access control (MAC) layer to route the LWM2M network packet to a sensor node when a destination Internet Protocol (IP) address specified in the LWM2M network packet matches a virtual IP address; and using a network layer to route the LWM2M network packet to the sensor node when the destination IP address does not match a virtual IP address.

22 Claims, 11 Drawing Sheets

(56) References Cited

U.S. PATENT DOCUMENTS

| | | |
|---|---|---|
| 8,547,982 B2 | 10/2013 | Sultan et al. |
| 8,711,743 B2 | 4/2014 | De Poorter et al. |
| 2007/0060147 A1 | 3/2007 | Shin et al. |
| 2009/0161581 A1 | 6/2009 | Kim |
| 2012/0166580 A1 | 6/2012 | Koo et al. |
| 2012/0182934 A1 | 7/2012 | Diachina et al. |
| 2013/0007199 A1 | 1/2013 | Malhotra et al. |
| 2014/0074979 A1 | 3/2014 | Singh et al. |
| 2014/0080528 A1 | 3/2014 | Lim et al. |
| 2014/0126655 A1 | 5/2014 | Vijayasankar et al. |
| 2014/0192719 A1 | 7/2014 | McCullough |
| 2014/0198713 A1 | 7/2014 | Park et al. |
| 2014/0376384 A1 | 12/2014 | Bandyopadhyay et al. |
| 2015/0141009 A1* | 5/2015 | Tamura ............... H04W 40/38 455/435.1 |
| 2015/0287307 A1 | 10/2015 | Rasband |
| 2017/0215023 A1* | 7/2017 | Ly ....................... H04W 4/70 |

OTHER PUBLICATIONS

Guenter Klas et al., *Lightweight M2M: Enabling Device Management and Applications for the Internet of Things*, White Paper, Vodafone, ARM, Ericsson, Feb. 26, 2014, 16 pages.

Gil Reiter, *Wireless Connectivity for the Internet of Things*, White Paper, Texas Instruments, Jun. 2014, 13 pages.

\* cited by examiner

NETWORK CONNECTIVITY FOR CONSTRAINED WIRELESS SENSOR NODES

TECHNICAL FIELD

The present disclosure relates generally to wireless sensor network environments, and more particularly, to enabling network connectivity for constrained wireless sensor nodes in wireless sensor network environments.

BACKGROUND

Wireless sensor networks (WSNs) are built from wireless sensor nodes, where each wireless sensor node is connected to one or more sensors for monitoring physical and/or environmental conditions, such as temperature, sound, vibration, pressure, humidity, motion, pollutants, and/or other environmental condition. With the advent of Internet of Things (IoT) and machine-to-machine (M2M) applications, WSNs face challenges with providing network connectivity to sensor nodes, particularly as resource constraints are continually tightened on the sensor nodes. Although existing wireless sensor network communications systems and methods have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

Figure 1:
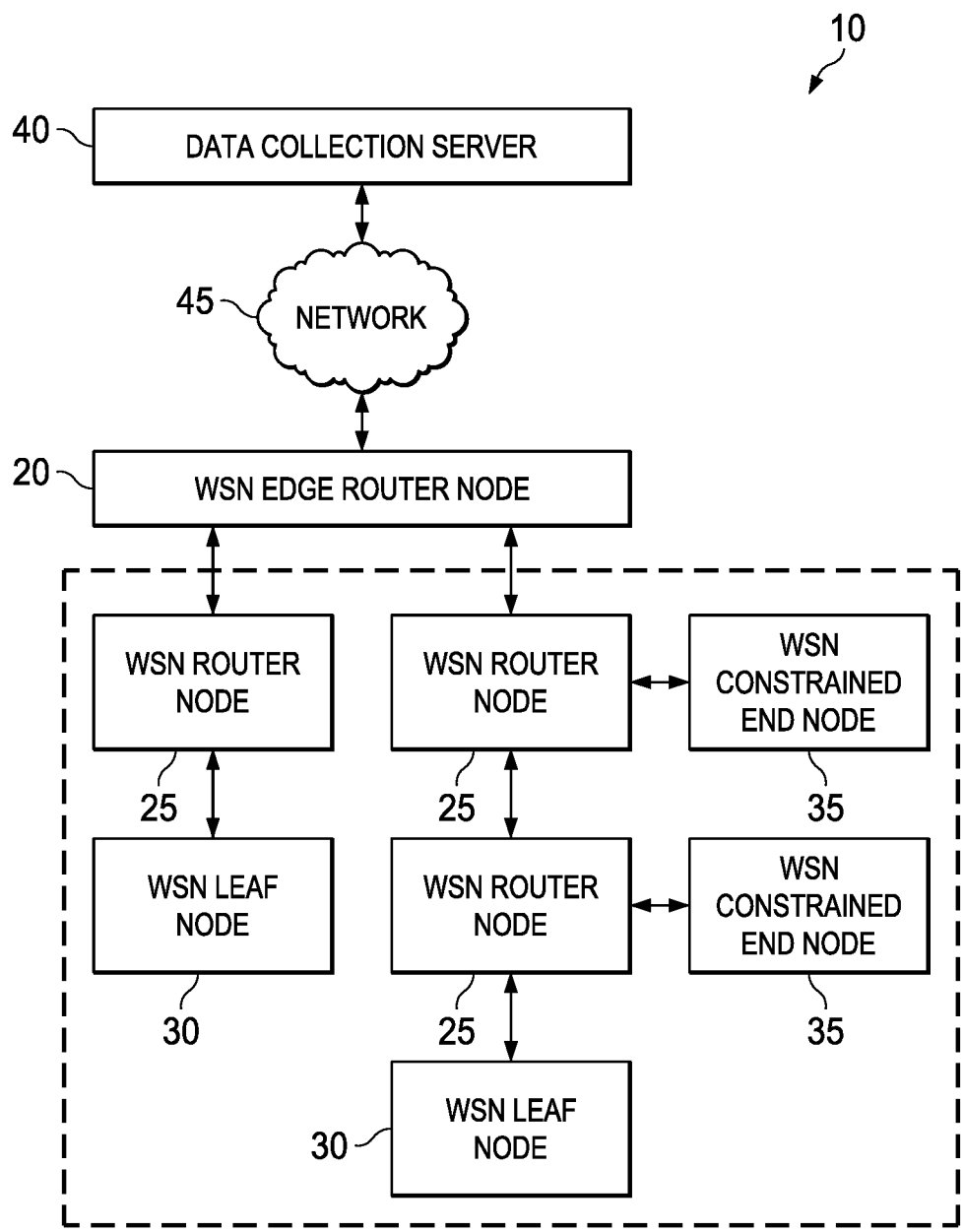
FIG. 1 is a schematic block diagram of a wireless sensor network system according to various aspects of the present disclosure.

A wireless sensor network node for enabling network connectivity in a wireless sensor network and associated methods are disclosed herein. An exemplary method for enabling network connectivity in a wireless sensor network includes receiving a Lightweight Machine-to-Machine (LWM2M) network packet from a network node over a network; using a media access control (MAC) layer to route the LWM2M network packet to a sensor node when a destination Internet Protocol (IP) address specified in the LWM2M network packet matches a virtual IP address; and using a network layer to route the LWM2M network packet to the sensor node when the destination IP address does not match a virtual IP address. Using the MAC layer to route the LWM2M network packet can facilitate IP-enabled end-to-end wireless communications, while using the network layer to route the LWM2M network packet can facilitate IP-based end-to-end wireless communications. The method can further include building an address translation table that maps MAC addresses to virtual IP addresses. In some implementations, the method further includes assigning a virtual IP address to the sensor node. In some implementations, the virtual IP address is assigned upon receiving a LWM2M network packet from the sensor node that includes a LWM2M registration request.

In some implementations, such as IP-enabled end-to-end wireless communications, using the MAC layer to route the LWM2M network packet includes mapping the virtual IP address to a MAC address and using the MAC address to route the LWM2M network packet. Using the MAC layer to route the LWM2M network packet can include converting a full application layer message in the LWM2M network packet into a partial application layer message. For example, in some implementations, the method further includes receiving a LWM2M network packet for the network node from the sensor node, converting a partial application layer message in the LWM2M network packet into a full application layer message, and setting a source IP address in the LWM2M network packet to a virtual IP address assigned to the sensor node. The application layer message may be a Constrained Application Protocol (CoAP) message. In some implementations, the method further includes adding a network protocol layer to the LWM2M network packet for the network node, wherein the sensor node generates a LWM2M payload of the LWM2M network packet. In some implementations, such as IP-based end-to-end wireless communications, using the network layer to route the LWM2M network packet includes using the destination IP address to route the LWM2M network packet to the sensor node.

DETAILED DESCRIPTION OF EXAMPLE EMBODIMENTS

Wireless sensor networks (WSNs) are built from wireless sensor nodes, where each wireless sensor node is connected to one or more sensors for monitoring physical and/or environmental conditions, such as temperature, sound, vibration, pressure, humidity, motion, pollutants, and/or other environmental condition. With the advent of Internet of Things (IoT) and machine-to-machine (M2M) applications, WSNs face challenges with providing network connectivity to sensor nodes. For example, while some sensor nodes achieve network connectivity using Internet Protocol version 6 (IPv6) and/or IPv6 over Low Power Wireless Personal Area Networks standards (6LoWPAN), other sensor nodes cannot accommodate these wireless communication protocols. In particular, constrained sensor nodes typically require tight limits on power, memory, and/or processing resources, limiting constrained sensor nodes from supporting such wireless communication protocols. Solutions for supporting seamless network connectivity for constrained sensor nodes are thus needed, particularly for extremely constrained sensor nodes (for example, sensor nodes limited to 4 KB RAM and/or 16 KB FLASH and/or requiring battery life that extends for 10+ years).

FIG. 1 is a schematic block diagram of a wireless sensor network system 10 according to various aspects of the present disclosure. Wireless sensor network system 10 includes various wireless sensor network nodes that cooperatively monitor, measure, and collect surrounding physical and/or environmental conditions (generally referred to as sensor data): wireless sensor network (WSN) edge router nodes 20 (also referred to as gateway nodes); wireless sensor network (WSN) router nodes 25; wireless sensor network (WSN) end nodes 30 (also referred to as end nodes); and wireless sensor network (WSN) constrained leaf nodes 35 (also referred to as constrained end nodes). WSN edge router nodes 20, WSN router nodes 25, WSN leaf nodes 30, and WSN constrained leaf nodes 35 wirelessly communicate using any appropriate wireless communication protocol, including various communication protocols based on Institute of Electrical and Electronics Engineers (IEEE) standards, such as IEEE 802.11-compliant (WiFi) communication protocols, IEEE 802.15-compliant communication protocols (for example, such as Bluetooth, SmartGrid IEEE 802.15.4g and/or WBAN IEEE 802.15.6g), other appropriate communication standard, and/or variations thereof. FIG. 1 has been simplified for the sake of clarity to better understand the inventive concepts of the present disclosure. In some implementations, WSN edge router nodes 20, WSN router nodes 25, WSN leaf nodes 30, and/or WSN constrained leaf nodes 35 are distributed throughout a location, for example, within and/or around a building, such as a warehouse, where the various WSN nodes can track information associated with the building or objects, people, animals, and/or entities (collectively referred to as things) associated with the building. Additional features can be added a wireless sensor network system 10, and some of the features described can be replaced or eliminated in other embodiments of a wireless sensor network system 10.

WSN edge router nodes 20 and/or WSN router nodes 25 can aggregate data collected by WSN leaf nodes 30 and/or WSN constrained leaf nodes 35. In various embodiments, WSN edge router nodes 20 and/or WSN router nodes 25 receive data signals from WSN leaf nodes 30 and/or WSN constrained leaf nodes 35, which include information about the surrounding environment of WSN leaf nodes 30 and/or WSN constrained leaf nodes 35. WSN edge router nodes 20 and/or WSN router nodes 25 can communicate the collected data to network elements of wireless sensor network system 10 or to network elements, such as a data collection server 40, over a network 45 (such as the Internet). In some implementations, WSN edge router nodes 20 and/or WSN router nodes 25 communicate with a host computer system and/or host database within wireless sensor network system 10 or with host computer system and/or host database (for example, associated with data collection server 40) over network 45, which can communicate with an application for processing information collected from WSN leaf nodes 30 and/or WSN constrained leaf nodes 35. As used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information. In some implementations, wireless sensor network system 10 represents an Internet of Things (IoT) system, where things (for example, objects, people, animals, and/or entities) and sensors within or attached to these things are connected to the Internet, such as network 45. The things can be connected to the Internet via wireless and/or wired connections. For example, in various embodiments, network 45 is the Internet, and edge router node 20 includes an IoT interface that connects edge router node 20 to network 45, such that information collected by WSN router nodes 25, WSN leaf nodes 30, and/or WSN constrained leaf nodes 35 can be communicated to network elements and/or applications over the Internet, such as data collection server 40. In some implementations, data collection server 40 manages WSN edge router nodes 20, WSN router nodes 25, WSN leaf nodes 30, and/or WSN constrained leaf nodes 35. For example, data collection server 40 manages timing of sensor data collection and/or sensor data transmission by WSN edge router nodes 20, WSN router nodes 25, WSN leaf nodes 30, and/or WSN constrained leaf nodes 35.

WSN constrained leaf nodes 35 generally refers to wireless sensor network nodes having constrained resources compared to WSN end nodes 30, including but not limited to, power, processing, and/or storage constraints. In some implementations, the term "constrained leaf node" refers to any wireless sensor network node having constrained resources, such as constraints on a maximum code complexity (for example, constrained read only memory (ROM) and/or FLASH memory), constraints on a size of state and/or buffers (for example, constrained random access memory (RAM)), constraints on an amount of computation feasible in a period of time (for example, constrained processing power), constraints on available power (for example, constrained battery life), constraints on a user interface and/or accessibility, and/or other constrained resources. In some implementations, as described herein, WSN leaf nodes 30 run network layer protocols (such as an Internet Protocol (IP) stack), while WSN constrained leaf nodes 35 do not run network layer protocols (meaning WSN constrained leaf nodes 35 lack IP stacks for network connectivity). In some implementations, WSN constrained leaf nodes 35 have constrained memory resources, for example, RAM limited to less than about 50 KB and/or FLASH limited to less than about 250 KB. In some implementations, WSN constrained leaf nodes 35 have extremely constrained memory resources, for example, RAM limited to less than about 4 KB and/or FLASH limited to less than about 16 KB.

Figure 2:
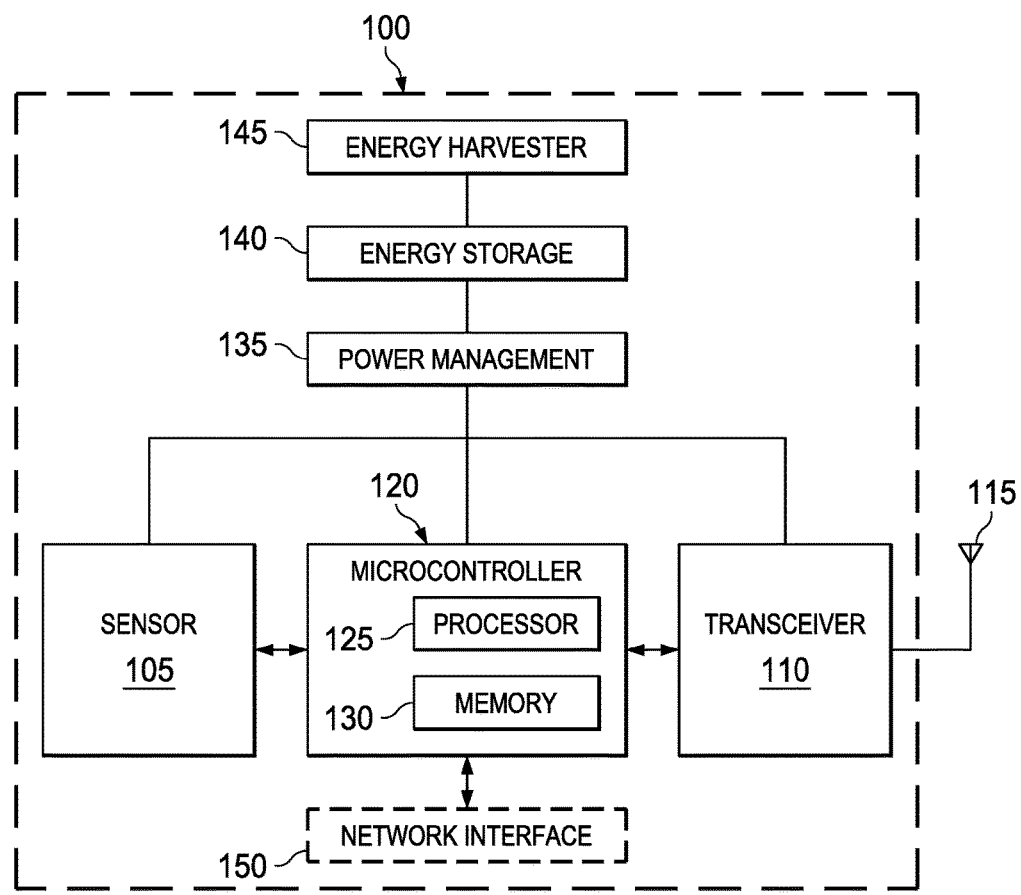
FIG. 2 is a schematic block diagram of an exemplary wireless sensor node for a wireless sensor network system according to various aspects of the present disclosure.

FIG. 2 is a schematic block diagram of an exemplary wireless sensor node 100, which can be implemented in wireless sensor network system 10, according to various aspects of the present disclosure. For example, WSN edge routers 20, WSN router nodes 25, WSN leaf nodes 30, and/or WSN constrained leaf nodes 35 may be configured as wireless sensor node 100. Wireless sensor node 100 generally includes a sensor 105, a transceiver 110, an antenna 115, a microcontroller 120 (including a processor 125 and a memory 130), a power management unit 135, an energy storage 140, an energy harvester 145, and a network interface 150. FIG. 2 has been simplified for the sake of clarity to better understand the inventive concepts of the present disclosure. Additional features can be added in wireless sensor node 100, and some of the features described can be replaced or eliminated in other embodiments of wireless sensor node 100.

Sensor 105 measures and collects surrounding physical and/or environmental conditions (generally referred to as sensor data). Sensor 105 is a temperature sensor, a moisture sensor, a vibration sensor (such as a one-axis vibration sensor, a two-axis vibration sensor, or a three-axis vibration sensor), a humidity sensor, a chemical sensor, an acoustic sensor, a pressure sensor, a magnetic sensor, an image sensor, a radiation sensor, a motion sensor, a microwave sensor, a light sensor, a position sensor, other type of sensor, or combination thereof. In some implementations, sensor 105 is a temperature sensor, such as a temperature sensor from Analog Devices, Inc. (ADI) (for example, ADI's ADT7420 temperature sensor or ADI's ADT75 temperature sensor). In some implementations, sensor 105 is a proximity sensor, such as ADI's AD7151 capacitance-to-digital converter for proximity sensing. In some implementations, sensor 105 is an accelerometer, such as ADI's ADXL362 three-axis MEMS accelerometer. In some implementations, sensor 105 is a smoke sensor, which implements ADI's AD7798 analog front end or ADI's AD7799 analog front end for smoke detection. Though wireless sensor node 100 is depicted as having only one sensor 105, the present disclosure contemplates wireless sensor node 100 having any number of sensors, including a combination of different types of sensors (such as a temperature sensor, a humidity sensor, and a light sensor).

Transceiver 110 and associated antenna 115 facilitate wireless communication of wireless sensor node 100 by receiving and transmitting wireless signals. For example, transceiver 110 can receive an intermediate data signal (also referred to as a baseband signal) and modulate the intermediate data signal onto a carrier signal for transmission by antenna 115, and transceiver 110 can receive a carrier signal from antenna 115 and down convert the carrier signal into an intermediate data signal. In some implementations, transceiver 110 is a radio frequency (RF) transceiver, and antenna 115 is an RF antenna. In some implementations, transceiver 110 is an ADI transceiver, such as a transceiver from ADI's ADF70xx transceiver family (for example, ADI's ADF7020 ISM Band Transceiver or ADI's ADF7021 Narrowband ISM Transceiver), ADI's ADF72xx transceiver family (for example, ADI's ADF7241 Low Power IEEE 802.15.4 Zero-IF Transceiver or ADI's ADF7242 IEEE 802.15.4 Zero-IF Transceiver), and/or ADI's ADF703x transceiver family. In some implementations, transceiver 110 and microcontroller 120 are fully integrated, for example, as provided by ADI's ADUCRFxxx family (for example, ADI's ADUCRF101 microcontroller with RF transceiver). In some implementations, transceiver 110 is replaced by a separate transmitter and a separate receiver. Further, wireless sensor node 100 can include more than one transceiver.

Microcontroller 120, connected to sensor 105 and transceiver 110, controls operation of wireless sensor node 100. For example, processor 125 is configured to execute instructions stored in memory 130 to collect sensor data and/or achieve various wireless communications operations described herein. In some implementations, microcontroller 120 includes an analog front end, such as an analog-to-digital converter (ADC), for converting analog signals received from sensor 105 (which represent sensor data) into digital signals for processing and/or storing in memory and sends them to the processing portion of subsystem 104. The processor can then perform simple operations on the received digital signal and can store it into memory. In some implementations, microcontroller 110 is an ADI microcontroller, such as a microcontroller from ADI's ADuCM36x microcontroller family and/or ADI's ADuC70xx microcontroller family (for example, ADI's ADuC7026 microcontroller).

Power management unit 135 controls power supplied by a power source (here, energy storage 140) to various components of wireless sensor node 100, such as sensor 105, transceiver 110, and microcontroller 120. The power source of wireless sensor node 100 can be an internal power source (for example, a battery internal to wireless sensor node 100), an external power source (for example, ambient energy harvested by energy harvester 145), or a combination thereof. Energy storage 140 represents any suitable energy storage, such as a rechargeable battery, a thin film battery, a super capacitor, and/or a capacitor. Energy harvester 145 derives, captures, and stores energy from external sources (for example, ambient energy). In some implementations, wireless sensor node 100 operates solely off RF energy harvested by energy harvester 145, which is stored by energy storage 140 and provided to various components of wireless sensor node 100 (for example, sensor 105, transceiver 110, microcontroller 120) by power management unit 135. In some implementations, energy harvester 145 implements an ADI microcontroller, such as a ADI's ADP5090 integrated boost regulatoruCM36x microcontroller family and/or ADI's ADuC70xx microcontroller family (for example, ADI's ADuC7026 microcontroller).

Network interface 150 connects wireless sensor node 100 to network elements within wireless sensor network system 10 and/or network elements over a network, such as network 45 depicted in FIG. 1. Network interface 150 can include an Ethernet interface and/or a universal serial bus (USB) interface for connecting to other networks, network elements, and/or applications. In various embodiments, Network interface 150 is an IoT interface that connects wireless sensor node 100 to an IoT system through a wired and/or wireless connection. For example, wireless sensor node 100 can be connected to the Internet. In some implementations, wireless sensor node 100 can directly communicate with the Internet and/or Internet connected entities and/or with other networks and/or network connected entities (such as a robot network, as described further below) via network interface 150.

The present disclosure configures each wireless sensor node with wireless communication capabilities depending on cost, power, processing, and/or power requirements of the wireless sensor node. Turning again to FIG. 1, WSN edge routers 20, WSN router nodes 25, WSN leaf nodes 30, and/or WSN constrained leaf nodes 35 wirelessly communicate using the Open Standards Interconnect (OSI) networking model. The OSI networking model divides data communication into seven layers, where each layer performs specific functions to support layers above it and offers services to the layers below it: a physical layer (Layer 1 (L1)), a data link layer (Layer 2 (L2)), a network layer (Layer 3 (L3)), a transport layer (Layer 4 (L4)), a session layer (Layer 5 (L5)), a presentation layer (Layer 6 (L6)), and an application layer (Layer 7 (L7)). The physical layer defines electrical and physical specifications for communicating data (for example, conveying data bit streams) between network nodes. The data link layer provides reliable transmission of data across the physical link, performing functions related to physical addressing, network topology, physical link management, error notification, ordered delivery of frames, and/or flow control. The network layer controls the routing of data, handling addressing and delivery of data and providing congestion control. The transport layer ensures data integrity, detects errors and lost data, recovers lost data, and manages retransmission of data. The session layer manages and tracks various connections. For example, the session layer can virtually connect application entities, synchronize data flow, create dialog units, connect parameter negotiations, partition services into functional groups, acknowledge data receipt, and/or retransmit data. The presentation layer handles how an application formats data to be sent out onto the network. For example, the presentation layer is responsible for data encryption/decryption, data compression/expansion, graphics formatting, content translation, and/or system-specific translation. The application layer represents a user interface or application software utilizing the network data.

Figure 3:
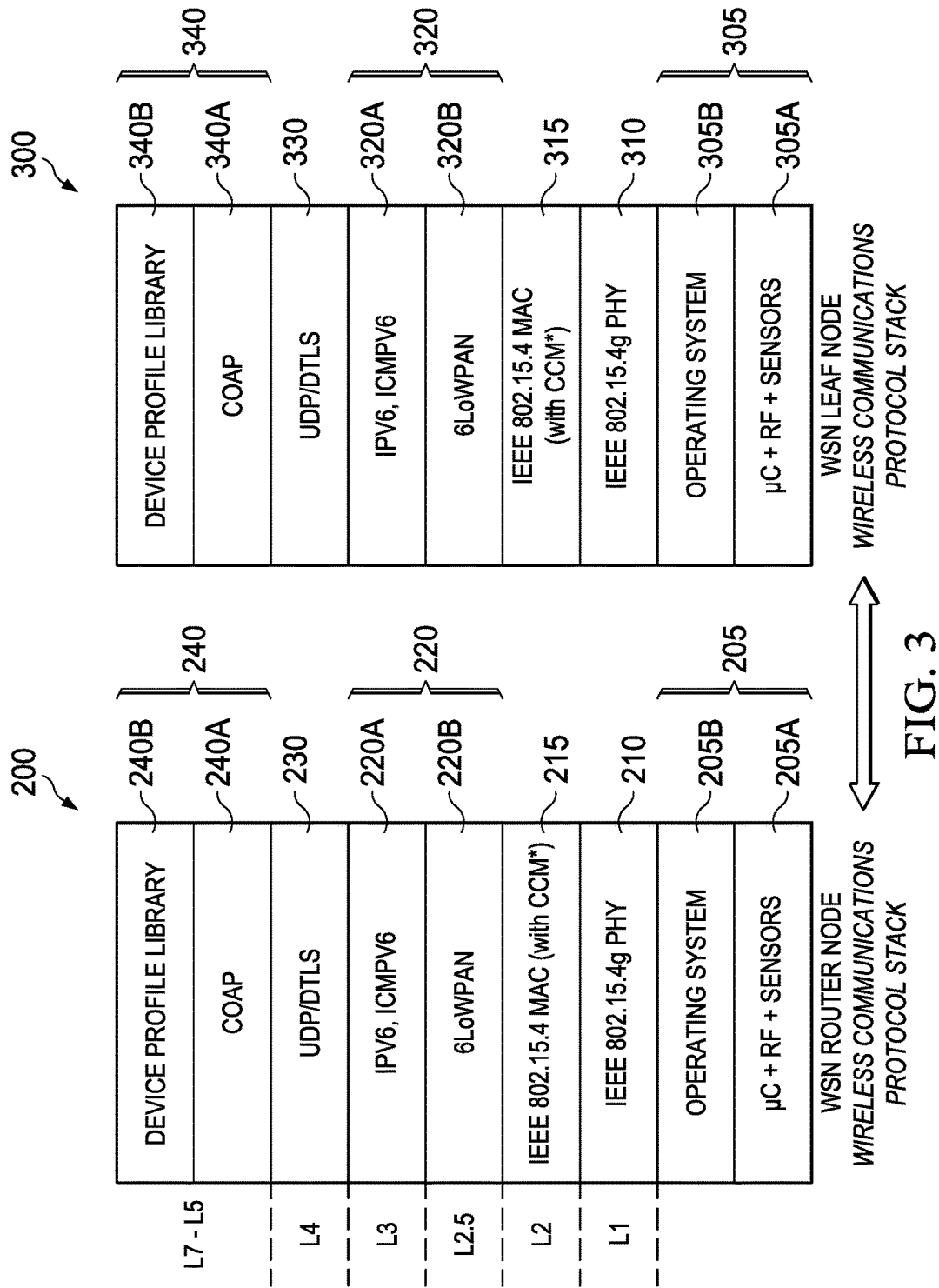
FIG. 3 schematically represents wireless communication protocol stacks for achieving IP-based end-to-end secure communications in a wireless sensor network system according to various aspects of the present disclosure.

FIG. 3 schematically represents wireless communication protocol stacks for achieving IP-based end-to-end secure communications in wireless sensor network system 10 according to various aspects of the present disclosure. In FIG. 3, a wireless communication protocol stack 200 based on the OSI model is depicted for implementation by WSN router node 25, and a wireless communication protocol stack 300 based on the OSI model is depicted for implementation by WSN leaf node 30. Wireless communication protocol stack 200 and wireless communication protocol stack 300 facilitate network connectivity (in particular, IP connectivity) for WSN leaf node 30 to data collection server 40 over network 45, such that WSN leaf node 30 can communicate sensor data to data collection server 40 and/or data collection server 40 can manage WSN leaf node 30. Wireless communication protocol stack 200 encompasses formal standards and polices (including rules, procedures, and message formats) defining how WSN router node 25 communicates with other nodes in wireless sensor network system 10, such as WSN edge router nodes 20, WSN router nodes 25, WSN leaf nodes 30, and WSN constrained leaf nodes 35. Wireless communication protocol stack 300 encompasses formal standards and polices (including rules, procedures, and message formats) defining how WSN leaf node 30 communicates with other nodes in wireless sensor network system 10, such as WSN edge router nodes 20, WSN router nodes 25, WSN leaf nodes 30, and WSN constrained leaf nodes 35. Wireless communication protocol stack 200 and wireless communication protocol stack 300 are both implemented in hardware, software, firmware, or a combination thereof. FIG. 3 has been simplified for the sake of clarity to better understand the inventive concepts of the present disclosure. Additional features can be added in wireless communication protocol stack 200 and wireless communication protocol stack 300, and some of the features described can be replaced or eliminated in other embodiments of wireless communication protocol stack 200 and wireless communication protocol stack 300.

For WSN router node 25, wireless communication protocol stack 200 is layered over a physical medium 205, which includes a hardware platform 205A and a software platform 205B. Hardware platform 205A generally refers to any hardware that facilitates sensing, processing, communicating, and storing capabilities of WSN router node 25, such as a sensor (for example, sensor 105), a transceiver (for example, transceiver 110), and a microcontroller (for example, microcontroller 120). Software platform 205B generally refers to any software that facilitates operating and programming capabilities of WSN router node 25, such as an operating system that implements wireless communication protocol stack 200 on WSN router node 25. The operating system manages resources of WSN router node 25 and provides an application programming interface (API) (for example, by abstracting underlying hardware platform 205A from applications (providing simplification and portability)). In some implementations, software platform 205B includes a Contiki operating system (OS), which is an open source operating system designed for wireless sensor networks and/or IoT applications. In some implementations, software platform 205B implements another operating system, such as TinyOS, MultimodAl System for NeTworks of In-situ Wireless Sensors (MANTIS), Nano-RK, LiteOS, .Net Micro Framework, and/or other suitable operating system.

Wireless communication protocol stack 200 includes a physical layer 210 and a media access control (MAC) layer 215 defined by IEEE 802.15.4 standards, which define a physical layer (PHY) and a MAC layer of the OSI model for Wireless Personal Area Networks (WPANs). IEEE 802.15.4 PHY layer 210 serves as an interface to physical medium 205 (for example, managing the transceiver(s) of hardware platform 205B) and facilitates data transmission services (for example, managing channel selection, energy, and/or signal functions). IEEE 802.15.4 PHY layer 210 can define frequency, power, modulation, and/or other wireless conditions of a selected channel for data transmission. IEEE 802.15.4 MAC layer 215 facilitates data transmission services (for example, by defining a format (MAC frames) for the transmitted data) using a physical channel, which may be defined by IEEE 802.15.4 PHY layer 210, and manages access to the physical channel. In some implementations, IEEE 802.15.4 MAC layer 215 operates with CCM*, which is a variation of a mode of operation that combines a counter mode of encryption with cipher block chaining message authentication mode (CBC-MAC) of encryption (collectively referred to as CCM). CCM* includes all feature of CCM, along with additional encryption-only and integrity-only capabilities. A network layer 220 builds on IEEE 802.15.4 PHY layer 210 and IEEE 802.15.4 PHY layer 215. Network layer 220 is defined by an Internet Protocol (IP), such as Internet Protocol Version 4 (IPv4) or Internet Protocol Version 6 (IPv6), which facilitates data transmission services across network boundaries. For example, network layer 220 allows WSN router node 25 to communicate with data collection server 45 over network 45. In FIG. 3, network layer 220 is defined by under an IPv6 over Low Power WPAN (6LoWPAN) protocol, where network layer 220 is partitioned into IPv6 layer 220A and LoWPAN layer 220B. 6LoWPAN defines encapsulation and header compression mechanisms that facilitate transmission of IPv6 packets over IEEE 802.15.4 based networks. In some implementations, wireless network system 10 includes a LoWPAN that includes a group of 6LoWPAN nodes (here, WSN edge router nodes 20, WSN router nodes 25, and WSN leaf nodes 30) assigned unique IPv6 addresses that share a common IPv6 address prefix, meaning that a 6LoWPAN node's IPv6 address remains the same regardless of its location in the LoWPAN. Edge router nodes 20 connect the LoWPAN to other IP networks, such as network 45. Alternatively or additionally, IPv6 layer 220A is defined by an Internet Control Message Protocol (ICMP) or ICMP for IPv6 (ICMPv6). A transport layer 230 builds on network layer 220, and an application layer 240 builds on transport layer 230. Transport layer 230 is defined by a User Datagram Protocol (UDP), a transport layer for use with IP network layer protocols. In some implementations, transport layer 230 is further defined by a Datagram Transport Layer Security (DTLS), which ensures privacy and data integrity of network communications. Application layer 240 is defined by a Constrained Application Protocol (CoAP) layer 240A and a device profile library layer 240B. CoAP layer 240A implements an application layer protocol designed by IETF RFC 7252 for WSN nodes, and device profile library layer 240B defines device related information associated with WSN router node 25.

For WSN leaf node 30, wireless communication protocol stack 300 is layered over a physical medium 305, which includes a hardware platform 305A and a software platform 305B. Hardware platform 305A generally refers to any hardware that facilitates sensing, processing, communicating, and storing capabilities of WSN leaf node 30, such as a sensor (for example, sensor 105), a transceiver (for example, transceiver 110), and a microcontroller (for example, microcontroller 120). Software platform 305B generally refers to any software that facilitates operating and programming capabilities of WSN leaf node 30, such as an operating system that implements wireless communication protocol stack 300 on WSN leaf node 30. The operating system manages resources of WSN router node 30 and provides an application programming interface (for example, by abstracting underlying hardware platform 205A from applications (providing simplification and portability)). In some implementations, software platform 305B includes a Contiki OS, which is an open source operating system designed for wireless sensor networks and/or IoT applications. In some implementations, software platform 305B implements another operating system, such as TinyOS, MultimodAl System for NeTworks of In-situ Wireless Sensors (MANTIS), Nano-RK, LiteOS, .Net Micro Framework, and/or other suitable operating system.

Wireless communication protocol stack 300 includes a physical layer 310 and a media access control (MAC) layer 315 defined by IEEE 802.15.4 standards. IEEE 802.15.4 PHY layer 310 serves as an interface to physical medium 305 (for example, managing the transceiver(s) of hardware platform 305B) and facilitates data transmission services (for example, managing channel selection, energy, and/or signal functions). IEEE 802.15.4 PHY layer 310 can define frequency, power, modulation, and/or other wireless conditions of a selected channel for data transmission. IEEE 802.15.4 MAC layer 315 facilitates data transmission services (for example, by defining a format (MAC frames) for the transmitted data) using a physical channel, which may be defined by IEEE 802.15.4 PHY layer 310, and manages access to the physical channel. In some implementations, IEEE 802.15.4 MAC layer 215 operates with CCM*. A network layer 320 builds on IEEE 802.15.4 PHY layer 310 and IEEE 802.15.4 PHY layer 315. Network layer 320 is defined by IP, such as IPv4 or IPv6, which facilitates data transmission services across network boundaries. For example, network layer 320 allows WSN leaf node 30 to communicate with data collection server 45 over network 45. In FIG. 3, network layer 320 is defined by 6LoWPAN protocol, where network layer 320 is partitioned into IPv6 layer 320A and LoWPAN layer 320B. Alternatively or additionally, IPv6 layer 320A is defined by an Internet Control Message Protocol (ICMP) or ICMP for IPv6 (ICMPv6). A transport layer 330 builds on network layer 320, and an application layer 340 builds on transport layer 330. Transport layer 330 is defined by a UDP layer and/or DTLS layer. Application layer 340 includes a CoAP layer 340A and a device profile library layer 340B, which defines device related information associated with WSN leaf node 30.

As evident from wireless communication protocol stack 200 and wireless communication protocol stack 300, both WSN router node 25 and WSN leaf node 30 run IP stacks, allowing IP-based communication between WSN router node 25 and WSN leaf node 30, WSN router node 25 and data collection server 40 over network 45, and WSN leaf node 30 and data collection server 40 over network 45. For example, WSN leaf node 30 can send IP packets (including, for example, sensor data) to data collection server 40 via WSN router node 25 (and further WSN edge router node 20), and WSN leaf node 30 can receive IP packets (including, for example, sensor operation requirements) from data collection server 40 via WSN router node 25 (and further WSN edge router node 20). In such implementations, since IP connectivity between WSN leaf node 30 and data collection server 40 terminates at WSN leaf node 30, WSN router node 25 simply routes IP packets between WSN leaf node 30 and data collection server 40 without running higher protocol layers in wireless communication protocol stack 200 (such as transport layer 230 and application layer 240). By supporting IP-based communications, WSN leaf node 30 thus facilitates end-to-end IP connectivity between WSN leaf node 30 and data collection server 40 for achieving wireless sensor network operations.

Figure 4:
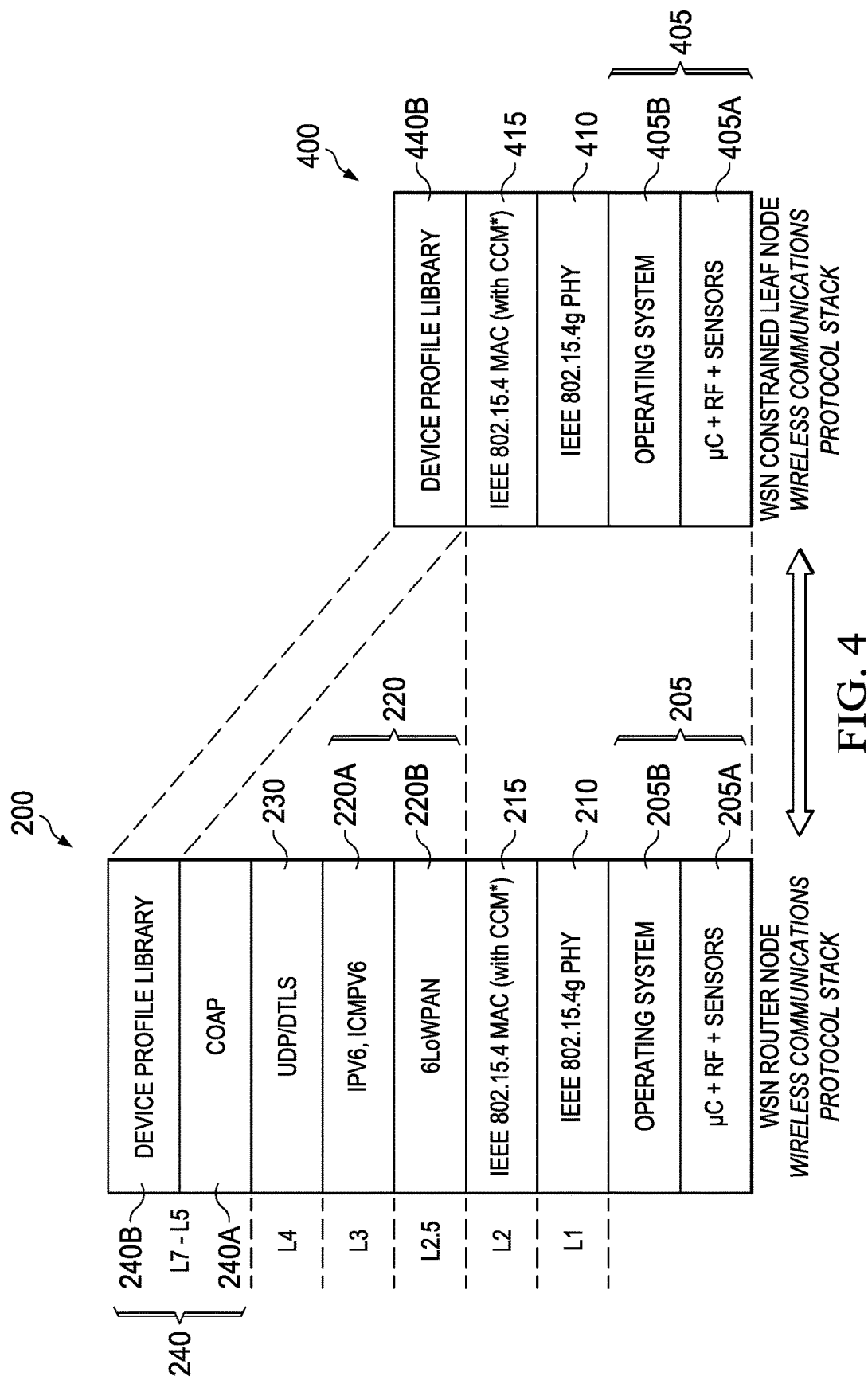
FIG. 4 schematically represents wireless communication protocol stacks for achieving IP-enabled end-to-end secure communications in a wireless sensor network system according to various aspects of the present disclosure.

FIG. 4 schematically represents wireless communication protocol stacks for achieving IP-enabled end-to-end secure communications in wireless sensor network system 10 according to various aspects of the present disclosure. In FIG. 4, wireless communication protocol stack 200 based on the OSI model is depicted for implementation by WSN router node 25, and a wireless communication protocol stack 400 based on the OSI model is depicted for implementation by WSN constrained leaf node 35. Wireless communication protocol stack 200 and wireless communication protocol stack 400 facilitate network connectivity (in particular, IP connectivity) for WSN constrained leaf node 35 to data collection server 40 over network 45, such that WSN constrained leaf node 35 can communicate sensor data to data collection server 40 and/or data collection server 40 can manage WSN leaf node 35. Wireless communication protocol stack 400 encompasses formal standards and polices (including rules, procedures, and message formats) defining how WSN constrained leaf node 35 communicates with other nodes in wireless sensor network system 10, such as WSN edge router nodes 20, WSN router nodes 25, WSN leaf nodes 30, and WSN constrained leaf nodes 35. Wireless communication protocol stack 400 is implemented in hardware, software, firmware, or a combination thereof. FIG. 4 has been simplified for the sake of clarity to better understand the inventive concepts of the present disclosure. Additional features can be added in wireless communication protocol stack 200 and wireless communication protocol stack 400, and some of the features described can be replaced or eliminated in other embodiments of wireless communication protocol stack 200 and wireless communication protocol stack 400.

For WSN constrained leaf node 35, wireless communication protocol stack 400 is layered over a physical medium 405, which includes a hardware platform 405A and a software platform 405B. Hardware platform 405A generally refers to any hardware that facilitates sensing, processing, communicating, and storing capabilities of WSN constrained leaf node 35, such as a sensor (for example, sensor 105), a transceiver (for example, transceiver 110), and a microcontroller (for example, microcontroller 120). Software platform 405B generally refers to any software that facilitates operating and programming capabilities of WSN constrained leaf node 35, such as an operating system that implements wireless communication protocol stack 400 on WSN constrained leaf node 35. The operating system manages resources of WSN constrained leaf node 35 and provides an application programming interface (API) (for example, by abstracting underlying hardware platform 405A from applications (providing simplification and portability)). In some implementations, software platform 405B includes a Contiki OS. In some implementations, software platform 405B implements another operating system, such as TinyOS, MultimodAl System for NeTworks of In-situ Wireless Sensors (MANTIS), Nano-RK, LiteOS, .Net Micro Framework, and/or other suitable operating system. Similar to wireless communication protocol stack 200 and wireless communication protocol stack 300, wireless communication protocol stack 400 includes a physical layer 410 and a media access control (MAC) layer 415 defined by IEEE 802.15.4 standards. IEEE 802.15.4 PHY layer 410 serves as an interface to physical medium 405 (for example, managing the transceiver(s) of hardware platform 405B) and facilitates data transmission services (for example, managing channel selection, energy, and/or signal functions). IEEE 802.15.4 PHY layer 410 can define frequency, power, modulation, and/or other wireless conditions of a selected channel for data transmission. IEEE 802.15.4 MAC layer 415 facilitates data transmission services (for example, by defining a format (MAC frames) for the transmitted data) using a physical channel, which may be defined by IEEE 802.15.4 PHY layer 410, and manages access to the physical channel. In some implementations, IEEE 802.15.4 MAC layer 415 operates with CCM*.

To meet reduced resource requirements for WSN constrained leaf node 35, other than providing a device profile library layer 440B that defines device related information associated with WSN constrained leaf node 35, wireless communication protocol stack 400 eliminates a network layer, a transport layer, and an application layer (such as that provided by network layer 320, transport layer 330, and application layer 340 in wireless communication protocol stack 300 for WSN leaf node 30). WSN constrained leaf node 35 communicates with nodes in wireless network system 10 using non-IP based communications, relying on WSN router node 25 for network connectivity to network 45 (particularly, to data collection server 40 over network 45). In such implementations, IP connectivity between WSN constrained leaf node 35 and data collection server 40 terminates at WSN router node 25. Since WSN router node 25 operates using wireless communication protocol stack 200, which includes a complete IP stack (in the depicted embodiments, a complete IPv6/6LoWPAN stack), WSN router node 25 transports network traffic between data collection server 40 and WSN constrained leaf node 35 by communicating with data collection server 40 using IP-based communications and communicating with WSN constrained leaf node 35 using non-IP based communications. Such allows WSN constrained leaf node 35 to seamlessly connect to network 45, while data collection server 40 is completely unaware that its IP-based communications are not received by WSN constrained leaf node 35. WSN router node 25 thus maintains (enables) end-to-end IP connectivity between WSN constrained leaf node 35 and data collection server 40 for achieving wireless sensor network operations, enabling WSN constrained leaf node 35 to significantly reduce resource requirements (including power, memory, and processing requirements) by eliminating protocol layers required for supporting IP-based communications.

To enable such proxy behavior, the present disclosure proposes implementing OMA Lightweight M2M as the application layer in wireless communication protocol stacks for wireless sensor network system 10. OMA Lightweight M2M (LWM2M) is a protocol from Open Mobile Alliance (OMA) for M2M and/or IoT device and service management, particularly addressing device and service management needs for constrained devices, such as WSN constrained leaf nodes 35. FIG. 5A is a schematic block diagram of an exemplary LWM2M architecture 500 according to various aspects of the present disclosure. LWM2M defines three logical components: (1) a LWM2M Server 502, (2) a LWM2M Client 504, and (3) a LWM2M Bootstrap Server 506. LWM2M Server 502 manages LWM2M Client 504, which is configured by LWM2M Bootstrap Server 506. LWM2M Client 504 receives operations from LWM2M Server 502, executes the received operations, and reports operation results to LWM2M Server 502 for device management and service enablement purposes. In wireless network system 10, data collection sever 40 represents LWM2M Server 504, WSN constrained leaf nodes 35 represent LWM2M Client 504, and WSN router nodes 25 represent L2M2M Bootstrap Server 504. LWM2M further defines four interfaces (collectively represented as LWM2M interfaces 508) for binding LWM2M Server 502, LWM2M Client 504, and LWM2M Bootstrap Server 506: (1) a Device Discovery and Registration Interface (used by LWM2M Client 504 for registering with LWM2M Server 502), (2) a Bootstrap Interface (used by LWM2M Bootstrap Server 506 for configuring LWM2M Client 504, for example, by setting initial parameters and configurations on LWM2M Client 504), (3) a Device Management and Service Enablement Interface (used by LWM2M Server 502 for performing device management and M2M service enablement for LWM2M Client 502), and (4) an Information Reporting Interface (used by LWM2M Client 504 to report resource information to LWM2M Server 502 (which can be periodically and/or events-based triggered).

LWM2M defines an Object Registry and Resource Registry. LWM2M Client 504 has a number of associated Resources 510 (information made available by LWM2M Client 504), which are logically organized into Objects 512. Each Object 512 defines a group of Resources 510, and each Resource 510 is identified by a Resource ID. Resources 510 are registered as specific to each Object 512, or alternatively, registered as re-usable (in other words, for re-use in any Object 512). LWM2M defines standard Objects 512 for device management purposes, provided in Table 1.

TABLE 1

OMA LWM2M Objects

| Object | Object ID |
| --- | --- |
| LWM2M Security | 0 |
| LWM2M Server | 1 |
| Access Control | 2 |
| Device | 3 |
| Connectivity Monitoring | 4 |
| Firmware | 5 |
| Location | 6 |
| Connectivity Statistics | 7 |

A LWM2M Security Object is defines security aspects between LWM2M Servers and LWM2M Clients, a LWM2M Server Object defines data and functions related to LWM2M Servers, an Access Control Object defines access rights of LWM2M Servers performing operations on LWM2M Clients, a Device Object defines device related information associated with LWM2M Clients, a Firmware Object defines parameters for managing firmware updates, a Location Object defines location-based device related information associated with LWM2M Clients, a Connectivity Monitoring Object defines monitoring parameters related to network connectivity, and a Connection Statistics Object defines statistical information related to network connectivity. LWM2M also enables other Objects and/or Resources to be defined to support desired M2M services. LWM2M Server 502 manipulates Resources 510 on LWM2M Client 504 using commands, such as read, write, execute, create, delete, write attributes, and/or discover. For example, in some implementations, LWM2M Server 502 can access the Device Object to retrieve device related information associated with a device on which LWM2M Client 504 resides, such as a manufacturer, a device type, a model number, a serial number, a hardware version, a software version, power management information (such as available power resources, power source voltage, power source current, battery level, and/or battery status), memory information (such as free memory and memory total), error information, and/or other device related information (such as device reboot and factory reset information). In some implementations, LWM2M Server 502 can use a Reboot Resource associated with the Device Object to reboot LWM2M Client 504, for example, to restore LWM2M Client 504 from unexpected firmware failure. Likewise, a Factory Reset Resource associated with the Device Object can be employed to perform factory reset LWM2M Client 504 to the same configuration as at initial deployment.

Figure 5B:
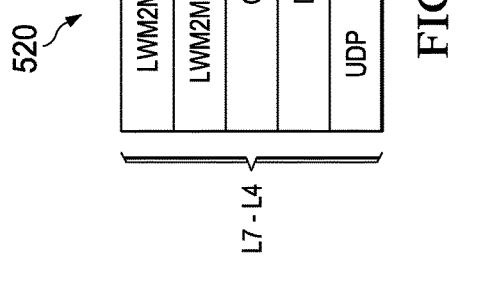
FIG. 5B schematically represents a generic LWM2M protocol stack according to various aspects of the present disclosure.
Figure 5A:
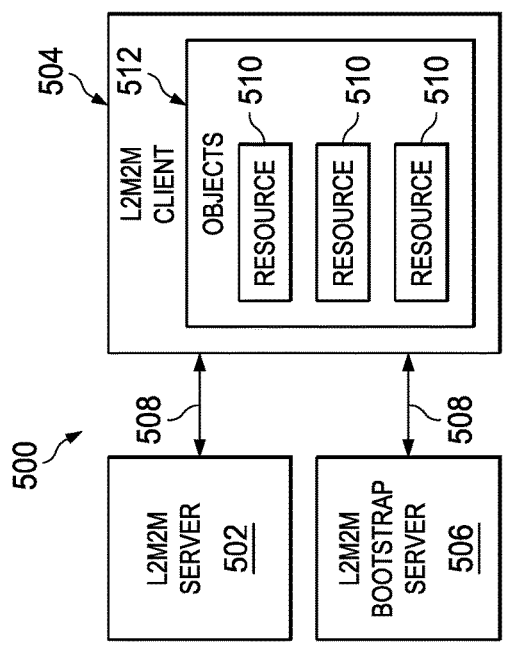
FIG. 5A is a schematic block diagram of an exemplary Open Mobile Alliance Lightweight Machine-to-Machine (LWM2M) architecture according to various aspects of the present disclosure.

FIG. 5B schematically represents a generic LWM2M protocol stack 520, which can be implemented at Layer 4-Layer 7 of the OSI model, according to various aspects of the present disclosure. LWM2M utilizes IETF CoAP as an underlying transfer protocol across a datagram-oriented transport, such as UDP and/or SMS. In FIG. 5B, LWM2M protocol stack 520 includes a transport layer 530, which includes a UDP transport layer 530A and a DTLS layer 530B, and an application layer 540, which includes a CoAP layer 540A, an LWM2M Protocol layer 540B, and a LWM2M Objects layer 540C. For LWM2M, UDP binding is mandatory, while UDP transport layer 530A optionally further includes Short Message Service (SMS) binding. DTLS layer 530B provides a secure channel for exchanging messages between LWM2M Server 502 and LWM2M Client 504. CoAP layer 540A defines a message header, request/response codes, message options, and retransmission mechanisms, where LWM2M uses only a subset of features defined by CoAP. LWM2M Protocol layer 540B defines logical operations and mechanisms for each interface (detailed above), and LWM2M Objects layer 540C defines each functionality provided by LWM2M Client 502 using LWM2M Objects, such as the standard Objects described above.

Figure 5C:
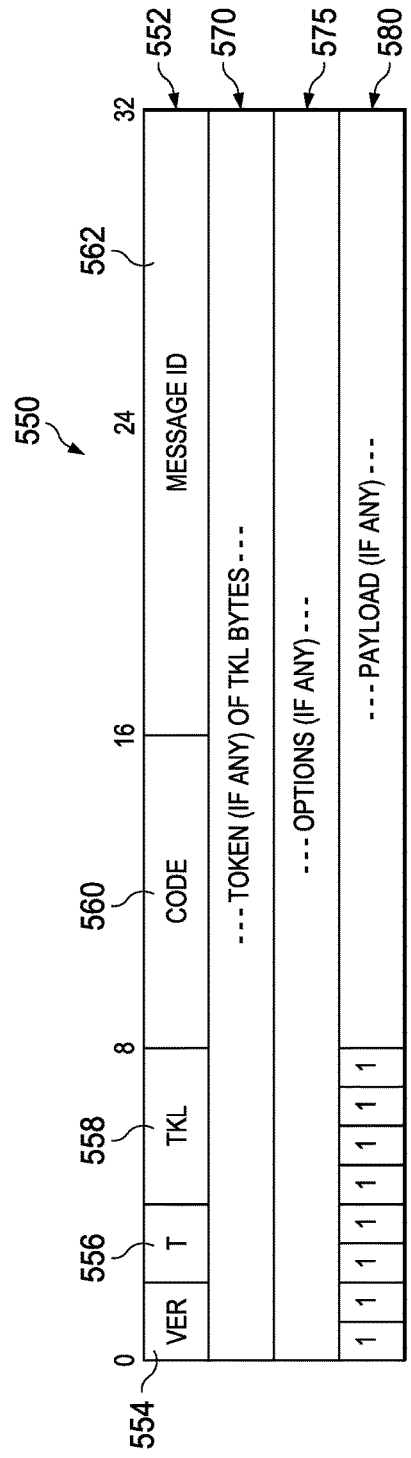
FIG. 5C schematically represents a generic Constrained Application Protocol (CoAP) message according to various aspects of the present disclosure.

FIG. 5C schematically represents a generic CoAP message 550 according to various aspects of the present disclosure. CoAP message 550 includes a fixed-size header (typically 4 bytes) containing the following fields: a version field (Ver) 554, which indicates a CoAP protocol version number (such as 01 binary for CoAP defined in IETF Requests for Comment (RFC) 7252, June 2014, available online at https://tools.ietf.org/html/rfc7252); a message type (T) field 556, which indicates whether a CoAP message is confirmable (0), non-confirmable (1), acknowledgement (2), or reset (3); a token length (TKL) field 558, which indicates a length of a Token field; a code field 560, which indicates a code for a client request or a server response (for example, a request code (0), a success response code (2), a client error response code (4), a server error response code (5)); and a message identification (ID) field 562, which facilitates detecting message duplication and matching acknowledgement/reset to confirmable/non-confirmable messages. CoAP message 500 follows the fixed-size header with a Token field 570, which can include a variable-length Token value (ranging from 0 to 8 bytes), a CoAP options field 575, which can include a sequence of CoAP Options in Type-Length-Value (TLV) format, and a payload field 580.

To realize LWM2M interfaces 508, LWM2M uses only basic binary CoAP message headers and a small subset of options, including (1) using a same base message (4-byte binary CoAP message header) for Request and Response interactions; (2) supporting confirmable, acknowledgement, and reset messages (typically mandatory), while optionally supporting non-confirmable messages; (3) mapping LWM2M operations to CoAP GET, PUT, POST and DELETE methods; (4) supporting a Uri-Path Option for identifying a requested interface, Object, and/or Resource; (5) supporting a Location-Path Option to indicate a registration handle for future update and delete operations; (6) supporting a Uri-Query Option; (7) supporting a Content-Type Option to indicate a media type of a payload (where a default value indicates plain text); and (8) supporting a Token Option for the Information Reporting interface to enable multiple requests in parallel with an endpoint.

Figure 6:
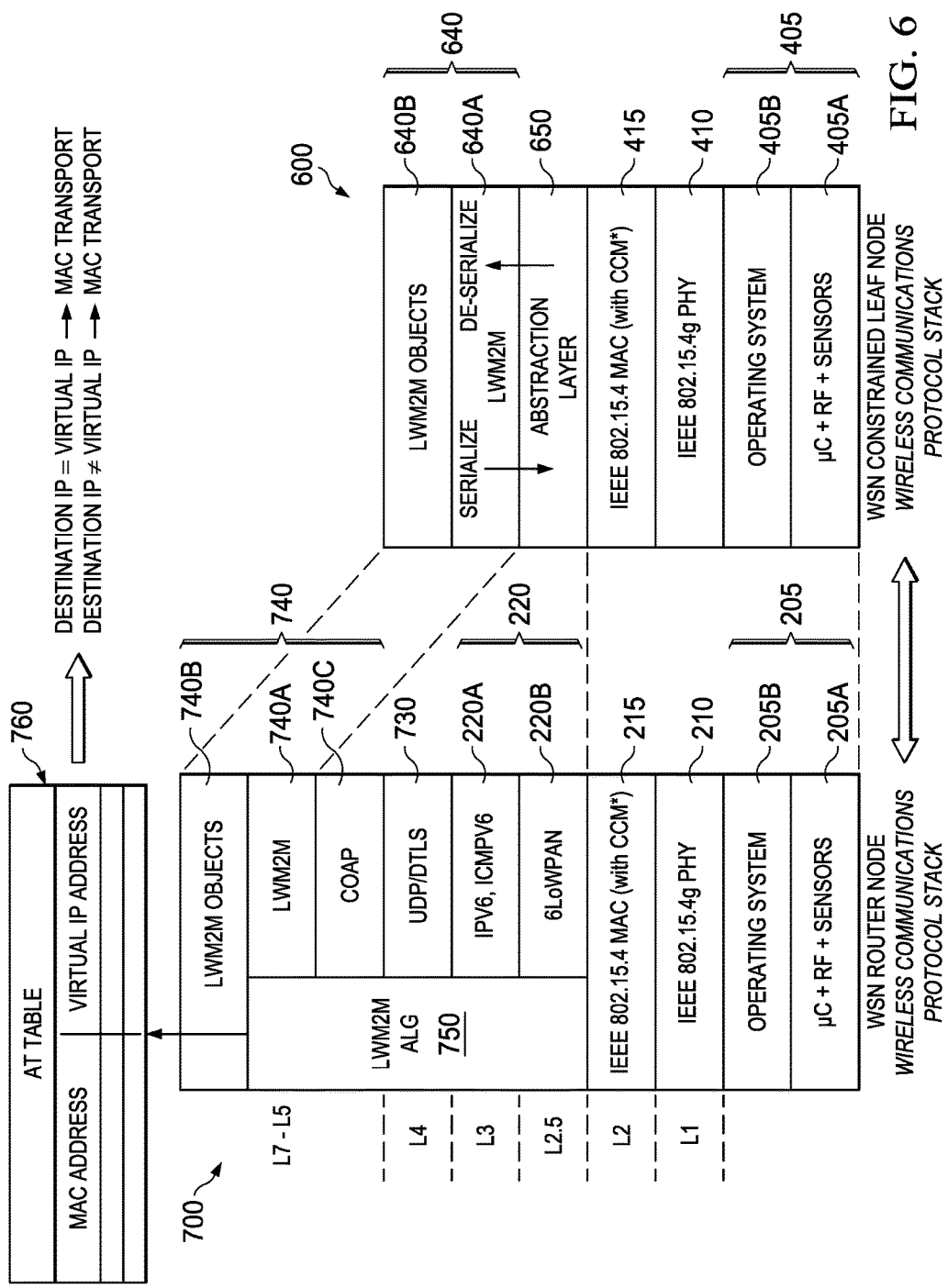
FIG. 6 schematically represents wireless communication protocol stacks that implement LWM2M for achieving IP-enabled end-to-end secure communications in a wireless sensor network system according to various aspects of the present disclosure.

FIG. 6 schematically represents wireless communication protocol stacks that implement LWM2M for achieving IP-enabled end-to-end secure communications in wireless sensor network system 10 according to various aspects of the present disclosure. In FIG. 6, a wireless communication protocol stack 600 based on the OSI model is depicted for implementation by WSN constrained leaf node 35, and a wireless communication protocol stack 700 based on the OSI model is depicted for implementation by WSN router node 25. Wireless communication protocol stack 600 and wireless communication protocol stack 700 facilitate network connectivity (in particular, IP connectivity) for WSN constrained leaf node 35 to data collection server 40 over network 45, such that data collection server 40 can manage WSN leaf node 35 and WSN constrained leaf node 35 can communicate sensor data to data collection server 40. Wireless communication protocol stack 600 encompasses formal standards and polices (including rules, procedures, and message formats) defining how WSN constrained leaf node 35 communicates with other nodes in wireless sensor network system 10, such as WSN edge router nodes 20, WSN router nodes 25, WSN leaf nodes 30, and WSN constrained leaf nodes 35. Wireless communication protocol stack 700 encompasses formal standards and polices (including rules, procedures, and message formats) defining how WSN router node 25 communicates with other nodes in wireless sensor network system 10, such as WSN edge router nodes 20, WSN router nodes 25, WSN leaf nodes 30, and WSN constrained leaf nodes 35. Wireless communication protocol stack 600 and wireless communication protocol stack 700 are implemented in hardware, software, firmware, or a combination thereof. FIG. 6 has been simplified for the sake of clarity to better understand the inventive concepts of the present disclosure. Additional features can be added in wireless communication protocol stack 600 and wireless communication protocol stack 700, and some of the features described can be replaced or eliminated in other embodiments of wireless communication protocol stack 600 and wireless communication protocol stack 700.

For WSN constrained leaf node 35, similar to wireless communication protocol stack 400 for WSN constrained leaf node 35, wireless communication protocol stack 600 is layered over physical medium 405, which includes hardware platform 405A and software platform 405B. Wireless communication protocol stack 600 also includes IEEE 802.15.4 PHY layer 410 and IEEE 802.15.4 MAC layer 415. Wireless communication protocol stack 600 also eliminates a network layer and a transport layer (such as that provided by network layer 320 and transport layer 330 in wireless communication protocol stack 300 for WSN leaf nodes 30). Accordingly, WSN constrained leaf node 35 communicates with nodes in wireless network system 10 using non-IP based communications, relying on WSN router node 25 for network connectivity to network 45 (particularly, to data collection server 40 over network 45). For example, in some implementations, WSN constrained leaf node 35 lacks CoAP support, UDP support, and/or IP support (such as IPv6/6LoWPAN) for establishing IP-based communications.

In contrast to wireless communication protocol stack 400, wireless communication protocol stack 600 includes an application layer 640 defined by LWM2M. For example, application layer 640 includes a LWM2M Protocol layer 640A and a LWM2M Objects Layer 640B. LWM2M Protocol layer 640A employs CoAP messages, enabling WSN constrained leaf node 35 to generate partial CoAP messages (which utilize basic CoAP message headers and the defined subset of options described above with reference to FIGS. 5A-5C). Wireless communication protocol stack 600 further includes an abstraction layer 650 for directly integrating application layer 640 (here, LWM2M Protocol layer 640A) with MAC layer 415 (here, IEEE 802.15.4 MAC layer 415). Since LWM2M Protocol layer 640A does not provide any direct mapping to MAC addresses, abstraction layer 650 facilitates communications between LWM2M Protocol layer 640A and IEEE 802.15.4 MAC layer 415 using pre-configured MAC IDs. When abstraction layer 650 receives messages from LWM2M Protocol layer 640A, abstraction layer 650 serializes the messages and constructs packets for IEEE 802.15.4 MAC layer 415. When abstraction layer 650 receives packets from IEEE 802.15.4 MAC layer 415, abstraction layer 650 de-serializes the packets and constructs messages for LWM2M Protocol layer 640A.

For WSN router node 25, similar to wireless communication protocol stack 200 for WSN router node 25, wireless communication protocol stack 700 is layered over physical medium 205, which includes hardware platform 205A and software platform 205B. Wireless communication protocol stack 700 also includes IEEE 802.15.4 PHY layer 210, IEEE 802.15.4 MAC layer 215, and network layer 220 (which includes IPv6 layer 220A and 6LoWPAN layer 220B). In contrast to wireless communication protocol stack 200, wireless communication protocol stack 700 implements an LWM2M protocol stack at Layer 4-Layer 7 of the OSI model. For example, wireless communication protocol stack 700 includes a transport layer 230 defined by UDP and/or DTLS, and an application layer 740 defined by LWM2M, which includes a LWM2M Protocol layer 740A, a LWM2M Objects layer 740B, and a CoAP layer 740C. Wireless communication protocol stack 700 further includes a LWM2M Application Layer Gateway (ALG) 750 that performs application layer aware message processing, providing routing support as needed for IP addressable nodes, such as WSN leaf nodes 30, and non-IP addressable nodes (also referred to as MAC addressable nodes), such as WSN constrained leaf nodes 35. Note that, by running LWM2M Protocol layer 740A and LWM2M Objects layer 740B, data collection server 40 can manage WSN router node 25, as well as WSN leaf nodes 30 and/or WSN constrained leaf nodes 35. However, the present disclosure contemplates implementations where wireless communication protocol stack 700 implements only LWM2M Application Layer Gateway 750 without any LWM2M protocol components, such as LWM2M Protocol layer 740A and LWM2M Objects layer 740B.

Upon establishing a logical connection between WSN router node 25 and WSN constrained leaf node 35 (for example, via data link layer based communication, such as MAC-based communication), WSN router node 25 acts as an IP translation agent (for example, an IPv6/6LoWPAN translation agent) for WSN constrained leaf node 35. LWM2M Application Layer Gateway (ALG) 750 translates network traffic between network nodes using IP-based communications, such as data collection server 40, and network nodes using non-IP based communications, such as WSN constrained leaf node 35. To facilitate such communications, LWM2M Application Layer Gateway 750 maintains an address translation (AT) table 760 that maps MAC addresses of WSN constrained leaf nodes 35 associated with WSN router node 25 to virtual IP addresses. For example, for each WSN constrained leaf node 35 using WSN router node 25 for network connectivity, WSN router node 25 assigns a virtual IP address to a MAC address associated with the WSN constrained leaf node 35. Using address translation table 760, WSN router node 25 generates a binding for transporting network traffic received from network nodes using IP-based communications, such as data collection server 40. For example, when WSN router node 25 receives network packet from data collection server 40, using LWM2M Application Layer Gateway 750, WSN router node 25 chooses a binding for transporting the network packet based on a destination IP address specified in the network packet (for example, a destination IP address specified in a CoAP message associated with a LWM2M network packet). When the destination IP address does not match a virtual IP address stored in address translation table 760, WSN router node 25 knows that the network packet is destined for a network node that implements IP-based communications (in other words, the network node runs an IP stack), such as WSN leaf node 30, and WSN router node 25 supports IP addressability and employs UDP transport for the network packet. When the destination IP address matches a virtual IP address stored in address translation table 760, WSN router node 25 knows that the network packet is destined for a network node that implements non-IP based communications (in other words, the network node does not run an IP stack), such as WSN constrained leaf node 35, and WSN router node 25 supports MAC addressability and employs MAC transport for the network packet. LWM2M Application Layer Gateway 750 thus filters a path of network traffic received from network nodes using IP-based communication, jumping to MAC layer 215 (here, IEEE 802.15.4 MAC layer) when WSN router node 25 receives a network packet specifying a virtual IP address as a destination and enabling direct interaction between application layer 740 and M layer 215 so that WSN router node 25 can communicate with WSN constrained leaf node 35. In some implementations, in the reverse direction (for example, when WSN router node 25 receives a network packet from WSN constrained leaf node 35 via MAC layer 215), various interfaces and/or formatting mechanisms are implemented to jump from MAC layer 215 to application layer 740. For example, WSN router node 25 may know to jump from MAC layer 215 to application layer 740 based on a reserved bits set in a MAC payload of the network packet. In some implementations, LWM2M Application Layer Gateway 750 inspects a payload of a network packet for IP address information and port information and performs Network Address Translation (NAT) processing when necessary. In some implementations, LWM2M Application Layer Gateway 750 permits data exchange for a particular session by opening a gate for a given IP address and given port number.

Since IP-based communication (for example, via IPv6/6LoWPAN in wireless sensor network system 10) is not available on WSN constrained leaf node 35, thus rendering WSN constrained leaf node 35 IP un-addressable, WSN router node 25 performs address translation using a MAC address and a virtual IP address assigned to WSN constrained leaf node 35. WSN router node 25 can use any suitable mechanism for assigning a virtual IP address to a MAC address for a given WSN constrained leaf node 35. In some implementations, WSN router node 25 uses Dynamic Host Configuration Protocol (DHCP) for assigning a virtual IP address to the MAC address for WSN constrained leaf node 35. For example, WSN router node 25 acts as a DHCP relay agent that dynamically assigns virtual IP addresses to WSN constrained leaf nodes 35 using DHCP mechanisms. DHCP enables a host, such as WSN router node 25 to request an IP address suitable for use on a network, such as network 45, from a server. The server can assign the IP address randomly (for example, from a pool of available IP addresses) or manually (for example, by an administrator based on the MAC address of the requesting host). In stateful DHCP, the server assigns IP addresses to hosts and records the IP addresses assigned to each host. In stateless DHCP, the server does not track IP addresses assigned per host, instead allocating domain names, DNS servers, and/or other host relevant information.

Alternatively, in some implementations, WSN router node 25 uses Stateless Address Auto-Configuration (SLAAC) for assigning virtual IP addresses to the MAC addresses for WSN constrained leaf nodes 35. SLAAC, unique to IPv6, is provided by built-in support for Neighbor Discovery (ND) included in IPv6. SLAAC uses IEEE-defined 64-bit Extended Unique Identifier (EUI-64) format for assigning IP addresses, combining a Layer 3 (L3) subnet prefix with a host's MAC address to generate an IP address. An IPv6 address includes a prefix and an interface identifier (IID) (for example, a 64-bit prefix combined with a 64-bit IID combined to form a 128 bit IP address). In some implementations, where wireless network system 10 includes a LoWPAN that includes a group of 6LoWPAN nodes (here, WSN edge router nodes 20, WSN router nodes 25, and WSN leaf nodes 30) assigned unique IPv6 addresses that share a common IPv6 address prefix, WSN router node 25 acquires the common IPv6 address prefix via a neighbor discovery route advertisement message (similar to conventional IPv6). WSN router node 25 typically acquires an IID that directly maps to a link layer address (in SLAAC, a link layer address of a wireless interface associated with WSN router node 25). Using a known prefix and a known link layer address for generating the IPv6 addresses can facilitate improved header compression ratios. In some implementations, WSN router node 25 uses SLAAC to convert the MAC address assigned to WSN constrained leaf node 35 to a virtual IP address (either link local or global), where an IID of the virtual IP address is derived from the MAC address. When WSN router node 25 generates a virtual IP address for WSN constrained leaf node 35 (which is stored in address translation table 760), WSN router node 25 can combine the common IPv6 address prefix for the LoWPAN with an IID calculated using the MAC address of WSN constrained leaf node 35.

By implementing LWM2M Application Layer Gateway 750, WSN router node 25 translates MAC addresses to virtual IP addresses, translates virtual IP addresses to MAC addresses, converts partial CoAP messages (used by WSN constrained leaf node 35) to standard CoAP messages, and converts standard CoAP messages (used by data collection server 40, for example) to partial CoAP messages. Consider when data collection server 40 (representing a remotely located LWM2M Server) manages WSN leaf nodes 30 and/or WSN constrained leaf nodes 35 (representing LWM2M Clients). WSN leaf nodes 30 and/or WSN constrained leaf nodes 35 can connect to any number of data collection servers 40, and WSN leaf nodes 30 and/or WSN constrained leaf nodes 35 communicate with data collection servers 40 over network 45. Note that all messages transmitted between WSN leaf nodes 30 and/or WSN constrained leaf nodes 35 and data collection servers 40 traverse WSN edge router 20, which connects WSN router nodes 25 to network 45 (for example, see FIG. 1).

Figure 7:
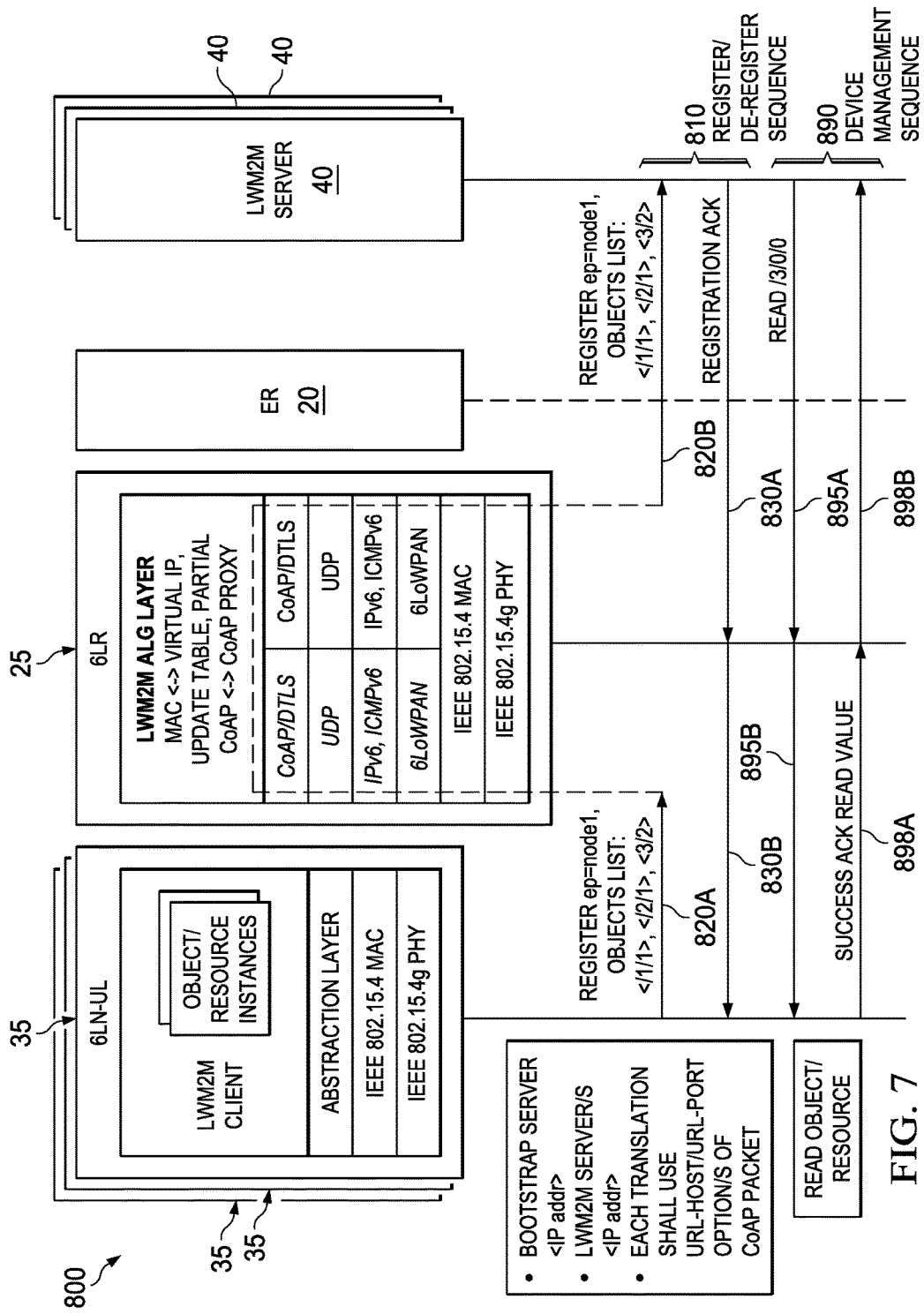
FIG. 7 schematically depicts IP-enabled end-to-end secure communications in a wireless sensor network system according to various aspects of the present disclosure.

FIG. 7 schematically depicts communications 800 between LWM2M Clients that implement non-IP based communication, such as WSN constrained leaf nodes 35, and a LWM2M Server, such as data collection server 40, when WSN router node 25 terminates IP connectivity for WSN constrained leaf nodes 35. Communications 800 illustrate bi-directional data transactions between WSN constrained leaf node 35 and data collection server 40 during registration and de-registration procedures and read object and resource procedures.

Figure 8A:
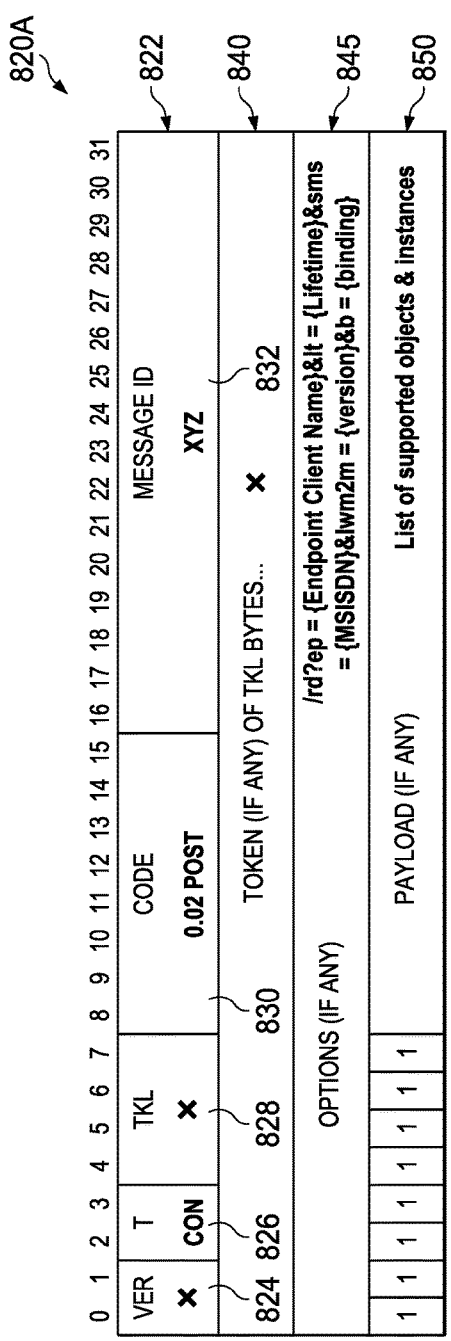
FIG. 8A schematically represents a LWM2M registration request message associated with IP-enabled end-to-end secure communications in a wireless sensor network system according to various aspects of the present disclosure.

During a Register/De-Register Sequence 810, WSN constrained leaf node 35 sends a LWM2M registration request message 820A (also referred to as a partial CoAP registration request message) to data collection server 40 via WSN router node 25. LWM2M registration request message 820A is a CoAP POST message that specifies a Uniform Resource Locator for data collection server 40, along with registration parameters (which are passed as query string parameters and Object & Object Instances in a payload of LWM2M registration request message 820A). FIG. 8A schematically represents LWM2M registration request message 820A, which WSN constrained leaf node 35 sends to data collection server 40, according to various aspects of the present disclosure. LWM2M registration request message 820A includes a CoAP message header 822 (which includes a version field 824, a message type field 826, a token length field 828, a code field 830, and a message ID field 832) followed by a token field 840, a CoAP options field 845, and a payload field 850. LWM2M registration request message 820A uses a CoAP message format, but in a partial way. For example, WSN constrained leaf node 35 does not use version field 824, token length field 828, and token field 840. In FIG. 8A, WSN constrained leaf node 35 uses message type field 826 to indicate a confirmable message, code field 830 to indicate a CoAP POST message (represented by Code 0.02), message ID field 832 to indicate an XYZ message identifier, CoAP options field 845 includes a Uniform Resource Identifier that indicates LWM2M registration operations for data collection server 40 (for example, /rd?ep=example-client), and payload field 850 includes a list of supported objects and/or object instances (for example, </1/1>,</1/2>,</2/0>,</2/1>,</3/0>).

When WSN router node 25 receives LWM2M registration request message 820A, LWM2M application gate layer 750 converts LWM2M registration request message 820A into a LWM2M registration request message 820B before sending the registration request to data collection server 40. LWM2M registration request message 820B includes a full CoAP message, along with a source IP address defined by a virtual IP address assigned to WSN constrained leaf node 35. For example, WSN router node 25 converts the partial CoAP message into a full CoAP message by filling any unused field in the partial CoAP message (here, version field 824, token length field 828, and token field 840) before passing the CoAP message to CoAP layer 740C. WSN router node 25 also maps a MAC address associated with WSN constrained leaf node 35 to a virtual IP address using address translation table 760, and WSN router node 25 specifies the virtual IP address assigned to WSN constrained leaf node 35 as a source IP address in LWM2M registration request message 820B. In some implementations, WSN router node 25 assigns the virtual IP address to WSN constrained leaf node 35 upon receiving LWM2M registration request message 820A and updates address translation table 760 to have an entry that maps the assigned virtual IP address to the MAC address for WSN constrained leaf node 35. In some implementations, WSN router node 25 assigns the virtual IP address to WSN constrained leaf node 35 upon discovering WSN constrained leaf node 35 in wireless sensor network system 10, such that WSN router node 25 already knows the virtual IP address.

In response to LWM2M registration request message 820B (having full CoAP message format) by WSN constrained leaf node 35 via a CoAP proxy (here, WSN router node 25), data collection server 40 sends a LWM2M registration acknowledgement message 830A when data collection server 40 successfully register WSN constrained leaf node 35. LWM2M registration acknowledgement message 830A includes Location-Path Options, which indicate a path for WSN constrained leaf node to use for updating and/or deleting registration. In some implementations, data collection server 40 returns a location under an /rd path segment.

Figure 8B:
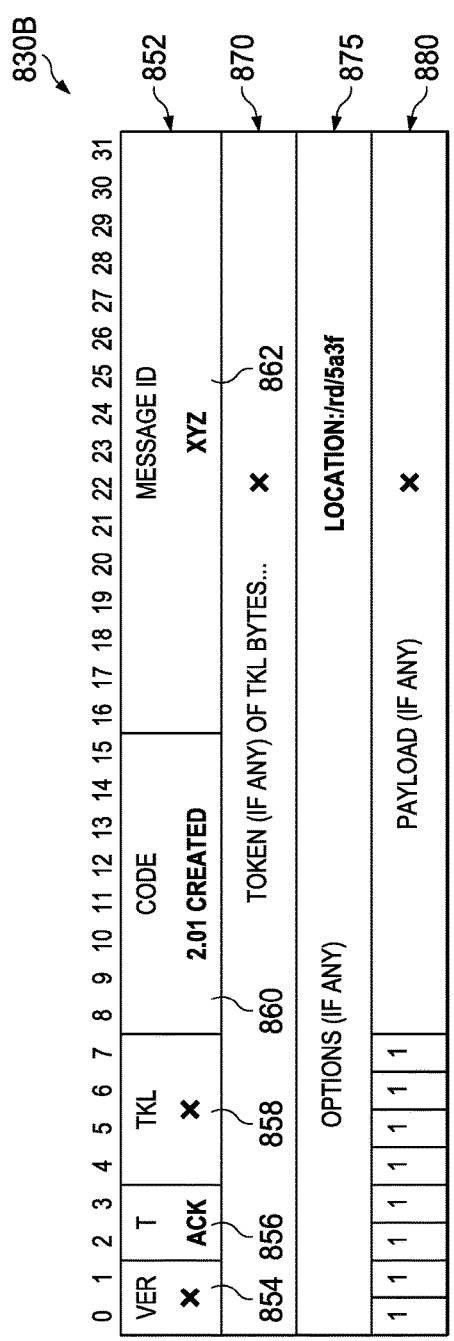
FIG. 8B schematically represents a LWM2M registration acknowledgement message associated with IP-enabled end-to-end secure communications in a wireless sensor network system according to various aspects of the present disclosure.

Upon receiving LWM2M registration acknowledgement message 830A, WSN router node 25 determines that a destination IP address associated with LWM2M registration acknowledgement message 830A matches a virtual IP address in address translation table 760. Accordingly, LWM2M application gate layer 750 converts LWM2M registration acknowledgement message 830A into a LWM2M registration acknowledgement message 830B (also referred to as a partial CoAP registration acknowledgement message) before sending the acknowledgement to WSN constrained leaf node 35. FIG. 8B schematically represents LWM2M registration acknowledgement message 830B, which WSN router node 25 sends to WSN constrained leaf node 35, according to various aspects of the present disclosure. For example, WSN router node 25 converts the full CoAP message into a partial CoAP message by removing information from fields not used by WSN constrained leaf node 35. LWM2M registration acknowledgement message 830B includes a CoAP message header 852 (which includes a version field 854, a message type field 856, a token length field 858, a code field 860, and a message ID field 862) followed by a token field 870, a CoAP options field 875, and a payload field 880. WSN router node 25 removes information from version field 854, token length field 858, and token field 870, while leaving information in message type field 856, code field 860, message ID field 862, and options field 875. In FIG. 8B, message type field 856 indicates an acknowledgement message, code field 860 indicates a CoAP CREATE message (represented by Code 2.01), message ID field 862 indicates the XYZ message identifier, and CoAP options field 875 includes a Uniform Resource Identifier for a Location-Path (for example, /rd/5a3f). WSN router node 25 also maps a virtual IP address specified in LWM2M registration acknowledgement message 830A to the MAC address associated with WSN constrained leaf node 35 using address translation table 760, such that LWM2M registration acknowledgement message 830B is sent to WSN constrained leaf node 35 using MAC transport.

During a Device Management Sequence 890, data collection server 40 sends a LWM2M read message 895A to gather information about a particular Object, Object Instance, Resource, and/or Resource Instance (for example, Read /3/0/0). Upon receiving receives LWM2M read message 895A, WSN router node 25 determines that a destination IP address associated with receives LWM2M read message 895A matches a virtual IP address in address translation table 760. Accordingly, LWM2M application gate layer 750 converts LWM2M read message 895A (a full CoAP message) into a LWM2M read message 895B (a partial CoAP read message) before sending the read message to WSN constrained leaf node 35. WSN router node 25 also maps a virtual IP address specified in LWM2M read message 895A to the MAC address associated with WSN constrained leaf node 35 using address translation table 760, such that LWM2M read message 895B is sent to WSN constrained leaf node 35 using MAC transport. In response to LWM2M read message 895B received by WSN constrained leaf node 35 via a CoAP proxy (here, WSN router node 25), WSN constrained leaf node 35 sends a LWM2M read acknowledgement message 898A. When WSN router node 25 receives LWM2M read acknowledgement message 898A, LWM2M application gate layer 750 converts LWM2M read acknowledgement message 898A (a partial CoAP message) into a LWM2M read acknowledgement message 898B (a full CoAP message) before sending the read acknowledgement to data collection server 40. WSN router node 25 also maps the MAC address associated with WSN constrained leaf node 35 to its virtual IP address using address translation table 760, and WSN router node 25 specifies the virtual IP address assigned to WSN constrained leaf node 35 as a source IP address in LWM2M read acknowledgement message 898B.

When WSN constrained leaf node 35 moves or no longer needs to be available to data collection server 40 (for example, upon a factory reset using the Device Object), WSN constrained leaf node 35 sends a LWM2M deregister message to data collection server 40, where WSN router node 25 provides translation and transmission services as described above. In such scenario, data collection server 40 removes registration information for WSN constrained leaf node 35 upon receiving the LWM2M deregister message, and WSN router node 25 can update address translation table 760 via LWM2M Application Layer Gateway 750 to remove the MAC-to-virtual IP address entry for WSN constrained leaf node 35. In some implementations, Register/De-Register Sequence 810 can provide a Lifetime parameter (for example, a default value of 24 hours), where data collection server 40 removes registration of WSN constrained leaf node 35 when no new registration or update registration information is received from WSN constrained leaf node 35 during a lifetime specified by the Lifetime parameter. In such implementations, WSN router node 25 can again update address translation table 760 via LWM2M Application Layer Gateway 750 to remove the MAC-to-virtual IP address entry for WSN constrained leaf node 35.

Figure 9:
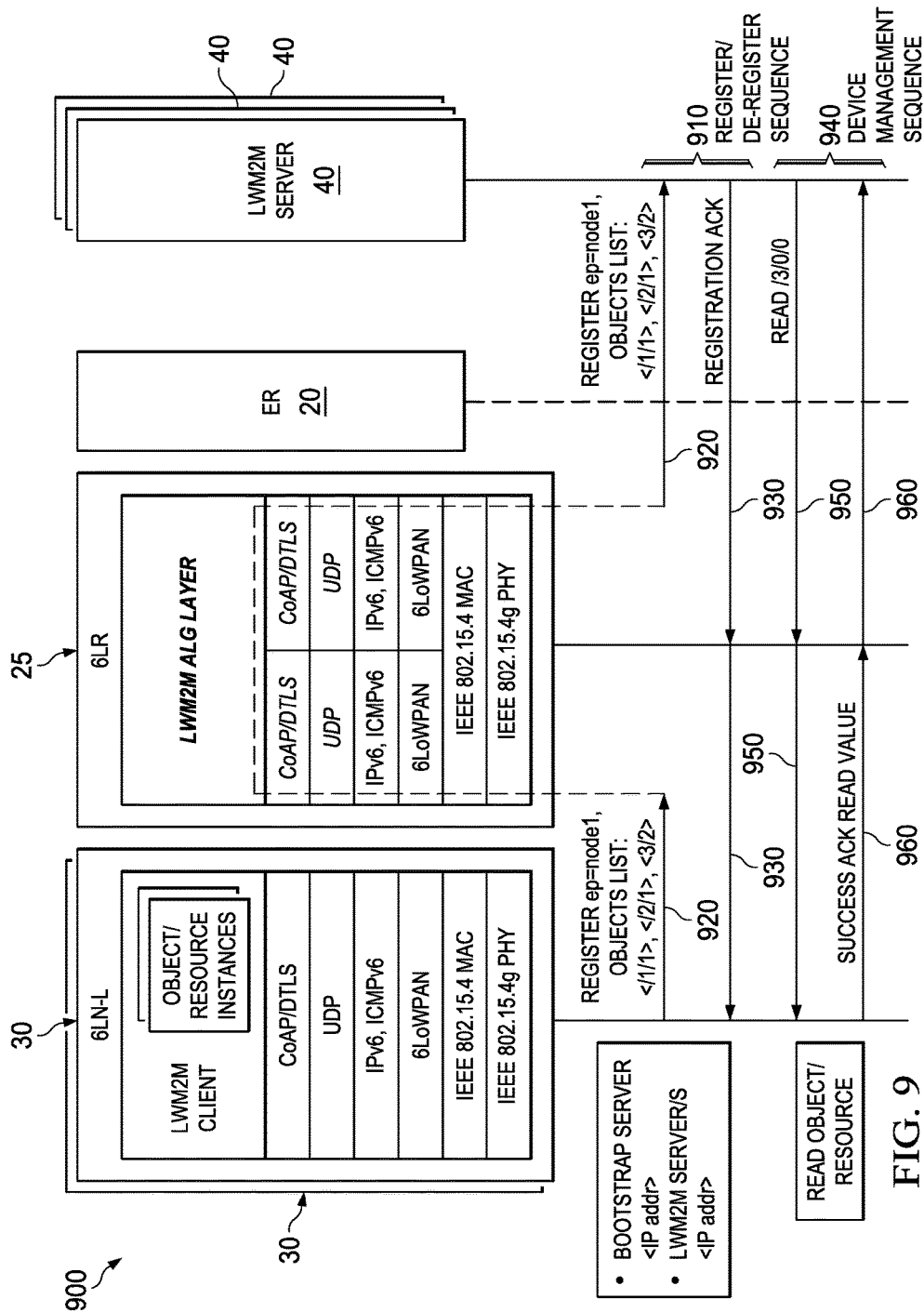
FIG. 9 schematically depicts IP-based end-to-end secure communications in a wireless sensor network system according to various aspects of the present disclosure.

FIG. 9 schematically depicts communications 900 between LWM2M Clients that implement IP based communication, such as WSN leaf nodes 30, and a LWM2M Server, such as data collection server 40, when end-to-end IP connectivity exists between WSN leaf nodes 30 and data collection server 40. Communications 900 illustrate bi-directional data transactions between WSN leaf nodes 35 and data collection server 40 during registration and de-registration procedures and read object and resource procedures. In such scenario, since WSN leaf node 30 runs an IP stack (here, IPv6 layer and 6LoWPAN layer) and WSN leaf node 30 can generate full CoAP messages (employing standard CoAP message format) to communicate with data collection server 40, WSN router node 25 does not activate Layers 4-7 when routing network traffic between WSN leaf node 30 and data collection server 40, and LWM2M application layer gateway 750 plays no major role in transporting the network traffic. During a Register/De-Register Sequence 910, WSN leaf node 30 sends a LWM2M registration request message 920 (a full CoAP registration request message) to data collection server 40 via WSN router node 25. Upon receiving LWM2M registration request message 920, WSN router node 25 determines that a destination IP address associated with LWM2M registration request message 920 does not match a virtual IP address in address translation table 760. Accordingly, WSN router node 25 routes LWM2M registration request message 920 (a full CoAP message) using IP transport to data collection server 40. In response to LWM2M registration request message 920, data collection server 40 sends a LWM2M registration acknowledgement message 930 when data collection server 40 successfully register WSN leaf node 30. Upon receiving LWM2M registration acknowledgement message 930, WSN router node 25 determines that a destination IP address associated with LWM2M registration acknowledgement message 930 does not match a virtual IP address in address translation table 760 and routes LWM2M registration acknowledgement message 930 (a full CoAP message) to WSN leaf node 30. A Device Management Sequence 940 proceeds similarly. For example, data collection server 40 sends a LWM2M read message 950 to gather information about a particular Object, Object Instance, Resource, and/or Resource Instance (for example, Read /3/0/0). Upon receiving LWM2M read message 950, WSN router node 25 determines that a destination IP address associated with LWM2M read message 950 does not match a virtual IP address in address translation table 760. Accordingly, WSN router node 25 routes LWM2M read message 950 (a full CoAP message) using IP transport to WSN leaf node 30. In response to LWM2M read message 950, WSN leaf node 30 generates and sends a LWM2M read acknowledgement message 960. Upon receiving LWM2M read acknowledgement message 960, WSN router node 25 determines that a destination IP address associated with LWM2M read acknowledgement message 960 does not match a virtual IP address in address translation table 760 and routes LWM2M read acknowledgement message 960 (a full CoAP message) to WSN leaf node 30.

Figure 10:
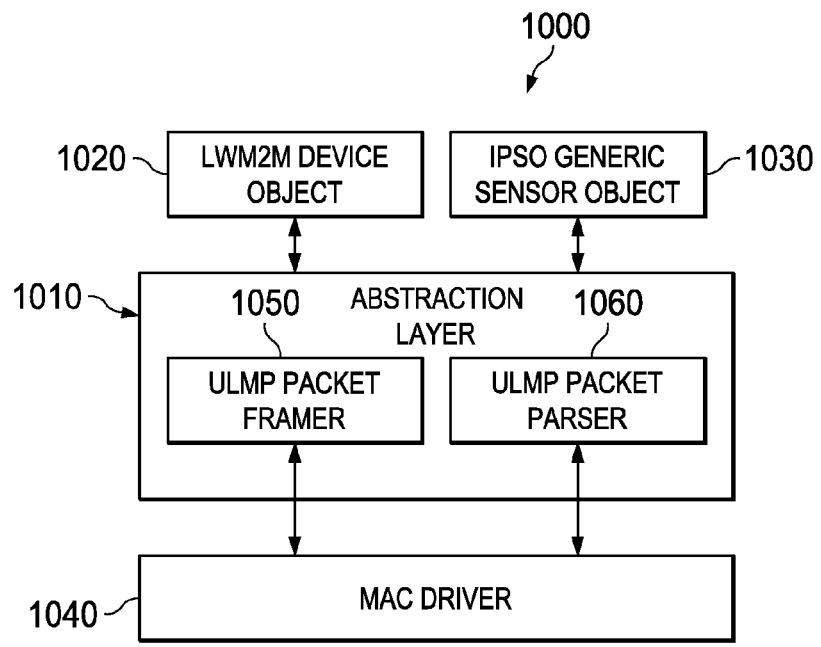
FIG. 10 is a schematic block diagram of an exemplary software module for running a wireless communication protocol stack defined by LWM2M for achieving IP-enabled end-to-end secure communications in a wireless sensor network system according to various aspects of the present disclosure.

FIG. 10 is a schematic block diagram of an exemplary software module 1000 for running a wireless communication protocol stack defined by LWM2M without IP-capabilities (for example, wireless communication protocol stack 600), which can be implemented in WSN constrained leaf nodes 35, according to various aspects of the present disclosure. Software module 1000 generally includes an abstraction layer 1010 that integrates an application layer (represented by LWM2M Device Object 1020 and IPSO Generic Sensor Object 1030) and a media access control (MAC) layer (represented by MAC driver 1040). Abstraction layer 1010 includes a packet frame 1050 for serializing messages received from the application layer and constructing packets for the MAC layer (here, MAC driver 1040) and a packet parser 1060 for de-serializing packets received from the MAC layer (here, MAC driver 1040) and constructing messages for the application layer. FIG. 10 has been simplified for the sake of clarity to better understand the inventive concepts of the present disclosure. Additional features can be added in software module 1000, and some of the features described can be replaced or eliminated in other embodiments of software module 1000.

Figure 11:
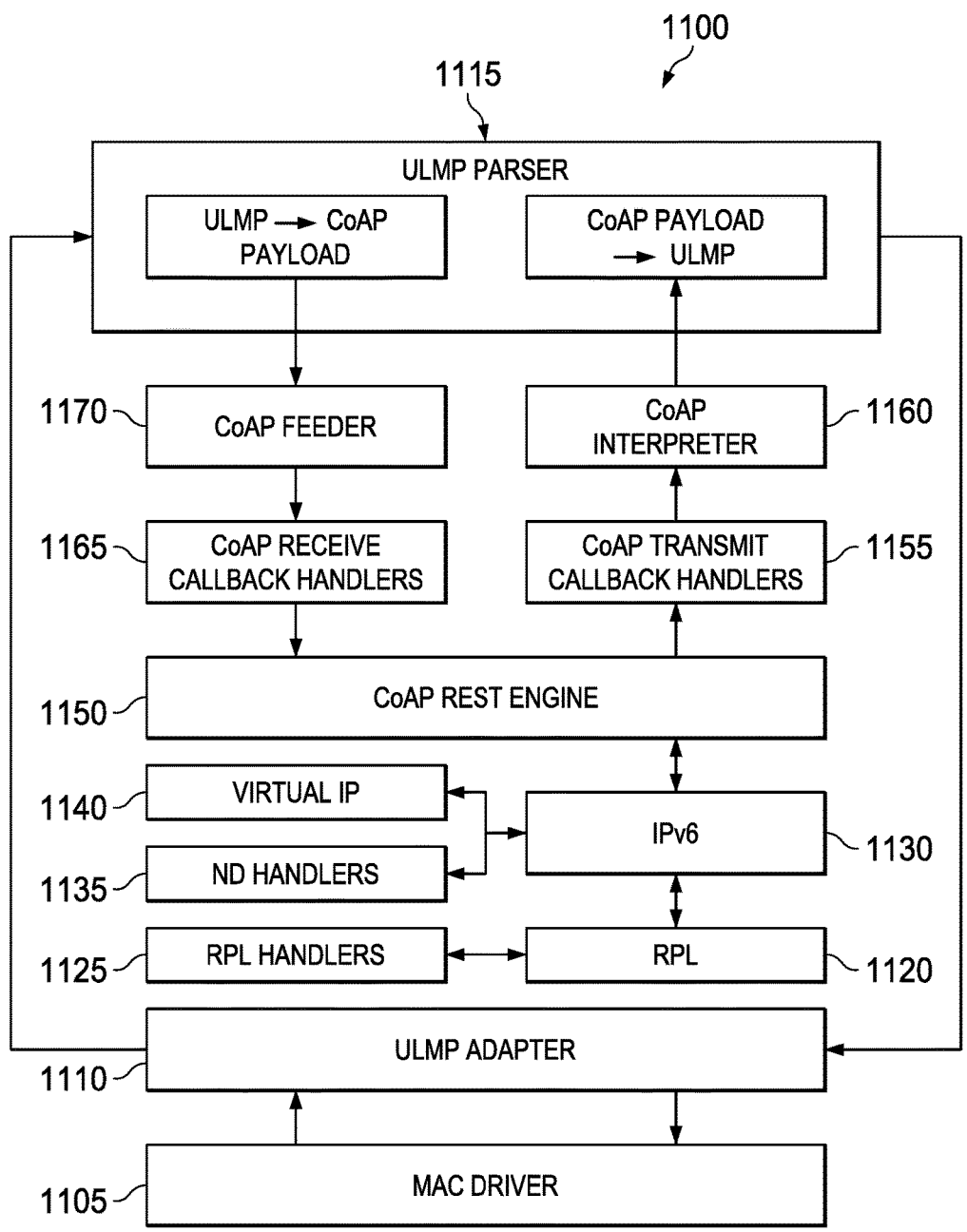
FIG. 11 is a schematic block diagram of an exemplary software module for running a wireless communication protocol stack defined by LWM2M for achieving IP-enabled end-to-end secure communications in a wireless sensor network system according to various aspects of the present disclosure.

FIG. 11 is a schematic block diagram of an exemplary LWM2M application layer gateway software module 1100, which can be implemented in WSN router nodes 25, according to various aspects of the present disclosure. LWM2M application layer gateway software module 1100 generally includes a MAC driver 1105, a ULMP Adapter 1110, and a ULMP Parser 1115. MAC driver 1105 is associated with a media access control (MAC) layer, such as the MAC layers described above, and ULMP Parser 1115 is associated with an application layer, such as the LWM2M Protocol layers described above. ULMP Adapter 1110 facilitates a jump to MAC transport, as described above, when an LWM2M application layer gateway determines that a destination IP address matches a virtual IP address maintained in an address translation table by the LWM2M application layer gateway. A routing protocol layer (RPL) block 1120 and a RPL handlers block 1125 are both associated with a network layer, such as 6LoWPAN layers described above. An IP block 1130, a neighbor discovery handlers block 1135, and a virtual IP block 1140 are associated with the network layer, such as IPv6 layers described above. A CoAP REST Engine 1150, a CoAP Transmit Callback Handlers, a CoAP Interpreter 1160, a CoAP Receive Callback Handlers 1165, and a CoAP Feeder 1170 are associated with the application layer, such as the CoAP layers described above. Various arrows in FIG. 11 depict network traffic flow. FIG. 11 has been simplified for the sake of clarity to better understand the inventive concepts of the present disclosure. Additional features can be added in LWM2M application layer gateway software module 1100, and some of the features described can be replaced or eliminated in other embodiments of LWM2M application layer gateway software module 1100.

Figure 12:
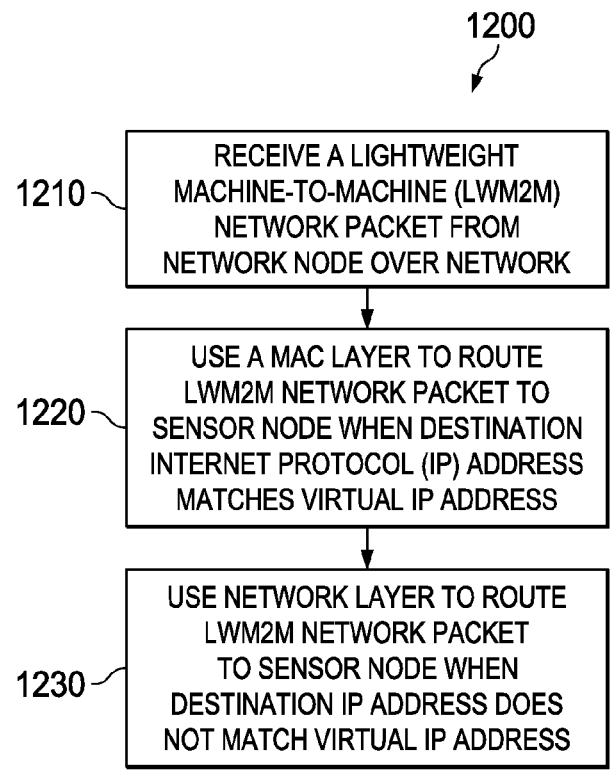
FIG. 12 is a flowchart of an exemplary method for enabling network connectivity in a wireless sensor network system according to various aspects of the present disclosure.

FIG. 12 is a flowchart of an exemplary method 1200 for enabling network connectivity in a wireless sensor network, such as wireless sensor network 10, according to various aspects of the present disclosure. In various implementations, WSN router nodes 25 and/or WSN edge router nodes 20 implement method 1200. At block 1210, a Lightweight Machine-to-Machine (LWM2M) network packet is received from a network node over a network. At block 1220, a media access control (MAC) layer is used to route the LWM2M network packet to a sensor node when a destination Internet Protocol (IP) address matches a virtual IP address. At block 1230, a network layer is used to route the LWM2M network packet to the sensor node when the destination IP address does not match a virtual IP address. Additional steps can be provided before, during, and after method 1200 and some of the steps described can be replaced or eliminated for other embodiments of method 1200.

In various implementations, components of the FIGURES can be implemented on a board of an associated electronic device. The board can be a general circuit board that can hold various components of an internal electronic system of the electronic device and, further, provide connectors for other peripherals. The board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, other considerations, or a combination thereof. Other components, such as external storage, sensors, controllers for audio/video display, and peripheral devices may be attached to the board as plug-in cards, via cables, or integrated into the board itself. In various implementations, components of the FIGURES can be implemented as stand-alone modules (for example, a device with associated components and circuitry configured to perform a specific application or function) or implemented as plug-in modules into application specific hardware of electronic devices. Note that particular embodiments of the present disclosure may be readily included in a system-on-chip (SOC) package, either in part, or in whole. An SOC represents an integrated circuit that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the various functions described herein may be implemented in one or more semiconductor cores (such as silicon cores) in application specific integrated circuits (ASICs), field programmable gate arrays (FPGAs), other semiconductor chips, or combinations thereof.

The various functions outlined herein may be implemented by logic encoded in one or more non-transitory and/or tangible media (for example, embedded logic provided in an application specific integrated circuit (ASIC), as digital signal processor (DSP) instructions, software (potentially inclusive of object code and source code) to be executed by a processor, or other similar machine, etc.). In some of these instances, a memory element can store data used for the operations described herein. This includes the memory element being able to store logic (for example, software, code, processor instructions) that is executed by a processor to carry out the activities described herein. The processor can execute any type of instructions associated with the data to achieve the operations detailed herein. In various implementations, the processor can transform an element or an article (such as data) from one state or thing to another state or thing. In another example, the activities outlined herein may be implemented with fixed logic or programmable logic (such as software/computer instructions executed by the processor) and the elements identified herein can be some type of a programmable processor (such as a DSP), programmable digital logic (e.g., a FPGA, an erasable programmable read only memory (EPROM), an electrically erasable programmable ROM (EEPROM)), or an ASIC that includes digital logic, software, code, electronic instructions, or any suitable combination thereof.

Note that the activities discussed above with reference to the FIGURES are applicable to any integrated circuits that involve signal processing, particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be a part of smartphones, tablets, security systems, PCs, gaming technologies, virtual reality, simulation training, etc.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than a restrictive sense.

Note that with the numerous examples provided herein, interaction may be described in terms of two, three, four, or more processing components. However, this has been done for purposes of clarity and example only. It should be appreciated that the system can be consolidated in any suitable manner. Along similar design alternatives, any of the illustrated components, modules, circuits, and elements of the FIGURES may be combined in various possible configurations, all of which are clearly within the broad scope of this Specification. In certain cases, it may be easier to describe one or more of the functionalities of a given set of flows by only referencing a limited number of processing components. It should be appreciated that the processing components of the FIGURES and its teachings are readily scalable and can accommodate a large number of components, as well as more complicated/sophisticated arrangements and configurations. Accordingly, the examples provided should not limit the scope or inhibit the broad teachings of the processing system and/or components as potentially applied to a myriad of other architectures.

Further, note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. It is further noted that "coupled to" and "coupled with" are used interchangeably herein, and that references to a feature "coupled to" or "coupled with" another feature include any communicative coupling means, electrical coupling means, mechanical coupling means, other coupling means, or a combination thereof that facilitates the feature functionalities and operations, such as the security check mechanisms, described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Other Notes, Examples, and Implementations

In various implementations, a system is provided. The system can include means for enabling network connectivity in a wireless sensor network system as described herein. The system can include means for receiving a Lightweight Machine-to-Machine (LWM2M) network packet from a network node over a network; means for using a media access control (MAC) layer to route the LWM2M network packet to a sensor node when a destination Internet Protocol (IP) address matches a virtual IP address; and means for using a network layer to route the LWM2M network packet to the sensor node when the destination IP address does not match a virtual IP address. The 'means for' in these instances can include (but is not limited to) using any suitable component discussed herein, along with any suitable software, circuitry, hub, computer code, logic, algorithms, hardware, controller, interface, link, bus, communication pathway, etc. In various implementations, the system includes memory that includes instructions that when executed cause the system to perform any of the activities discussed herein.

What is claimed is:

1. A method for enabling seamless network connectivity in a wireless sensor network system having leaf nodes and constrained leaf nodes, the method comprising:
    assigning, by a router node, a virtual Internet Protocol (IP) address to a media access control (MAC) address of a constrained leaf node in an address translation table, wherein the constrained leaf node is a non-Internet Protocol (IP) addressable node, and the address translation table has mapping of virtual IP addresses to MAC addresses of constrained leaf nodes associated with the router node;
    receiving, by the router node, a first Lightweight Machine-to-Machine (LWM2M) network packet over a network;
    using a MAC layer to route the first LWM2M network packet to the constrained leaf node, when a destination IP address specified in the first LWM2M network packet matches the virtual IP address of the constrained leaf node in the address translation table; and
    using a network layer to route the first LWM2M network packet to a leaf node when the destination IP address does not match a virtual IP address in the address translation table.

2. The method of claim 1, wherein using the MAC layer to route the first LWM2M network packet includes converting a full application layer message in the first LWM2M network packet into a partial application layer message.

3. The method of claim 2, wherein the full application layer message and the partial application layer message are a Constrained Application Protocol (CoAP) messages.

4. The method of claim 1, further comprising:
    receiving, by the router node, a second LWM2M network packet from the constrained leaf node;
    converting a partial application layer message in the second LWM2M network packet into a full application layer message; and
    setting a source IP address in the second LWM2M network packet to the virtual IP address assigned to the constrained leaf node.

5. The method of claim 4, wherein the partial application layer message and the full application layer message is a Constrained Application Protocol (CoAP) message.

6. The method of claim 1, wherein using the MAC layer to route the first LWM2M network packet includes mapping the virtual IP address in the destination IP address of the first LWM2M network packet to a MAC address of with the constrained leaf node in the address translation table and using the MAC address as a destination address to route the first LWM2M network packet.

7. The method of claim 1, wherein using the network layer to route the first LWM2M network packet includes using the destination IP address as a destination address to route the first LWM2M network packet to the leaf node.

8. The method of claim 1, wherein the router node assigns the virtual IP address to the MAC address of the constrained leaf node in the address translation table upon discovering the constrained leaf node in the wireless sensor network system.

9. The method of claim 8, wherein the router node assigns the virtual IP address to the MAC address of the constrained leaf node in the address translation table upon receiving a LWM2M registration request message from the constrained leaf node.

10. The method of claim 1, wherein using the MAC layer to route the first LWM2M network packet comprises removing information from fields not used by the constrained leaf node.

11. A non-transitory media encoded with logic that includes code for execution, and when executed by a processor, is operable to perform operations for enabling Internet Protocol (IP) end-to-end secure communications in a wireless sensor network system having constrained leaf nodes which do not implement an IP stack, comprising:
maintaining an address translation table that maps media access control (MAC) addresses of constrained leaf nodes associated with a router node to virtual IP addresses;
receiving, by a router node a first Lightweight Machine-to-Machine (LWM2M) network packet over a network;
determining whether a destination IP address specified in the first LWM2M network packet matches a virtual IP address of a constrained leaf node in the address translation table, wherein a match in the address translation table indicates the first LWM2M network packet is destined for the constrained leaf node and no match in the address translation table indicates the first LWM2M network packet is destined for one or more leaf nodes implementing an IP stack;
using a MAC layer to route the first LWM2M network packet to a constrained leaf node when the destination IP address is in the address translation table; and
using a network layer to route the first LWM2M network packet to a leaf node when the destination IP address is not in the address translation table.

12. The non-transitory media of claim 11, wherein using the MAC layer to route the first LWM2M network packet includes mapping the virtual IP address in the destination IP address of the first LWM2M network packet to a MAC address of the constrained leaf node in the address translation table and using the MAC address of the constrained leaf node as a destination address to route the first LWM2M network packet to the constrained leaf node.

13. The non-transitory media of claim 11, wherein using the network layer to route the first LWM2M network packet includes using the destination IP address as a destination address to route the first LWM2M network packet to the leaf node.

14. The non-transitory media of claim 11, wherein using the MAC layer to route the first LWM2M network packet includes converting a full application layer message in the first LWM2M network packet into a partial application layer message.

15. The non-transitory media of claim 11, the operations further comprising:
receiving, by the router node, a second LWM2M network packet from the constrained leaf node;
converting a partial application layer message in the second LWM2M network packet into a full application layer message; and
setting a source IP address in the second LWM2M network packet to a virtual IP address assigned to the constrained leaf node.

16. The non-transitory media of claim 11, the operations further comprising deriving the virtual IP address of the constrained leaf node by combining an address prefix and an interface identifier calculated using the MAC address of the constrained leaf node.

17. A wireless sensor network node for network connectivity in a wireless sensor network system having constrained leaf nodes which do not implement a network layer in a protocol stack, the wireless sensor network node comprising:
a memory for storing instructions and an address translation table mapping virtual Internet Protocol (IP) addresses to media access control (MAC) addresses of constrained leaf nodes associated with the wireless sensor network node; and
a processor operable to execute the instructions, wherein the processor and the memory cooperate such that a Lightweight Machine-to-Machine (LWM2M) application layer gateway is configured for:
building the address translation table by assigning virtual IP addresses to MAC addresses of constrained leaf nodes upon discovering constrained leaf nodes associated with the wireless sensor network node;
receiving a first LWM2M network packet over a network;
using a MAC layer to route the first LWM2M network packet to a constrained leaf node by converting the first LWM2M network packet from a full application layer message into a partial application layer message when a destination IP address specified in the first LWM2M network packet matches a virtual IP address in the address translation table; and
using a network layer to route the first LWM2M network packet to a leaf node when the destination IP address does not match a virtual IP address in the address translation table.

18. The wireless sensor network node of claim 17, wherein converting the first LWM2M network packet comprises removing information from fields not used by the constrained leaf node, the fields including version field, token length field, and token field.

19. The wireless sensor network node of claim 17, wherein using the MAC layer to route the first LWM2M network packet includes mapping the virtual IP address in the destination IP address of the first LWM2M network packet to a MAC address of the constrained leaf node in the address translation table and using the MAC address of the constrained leaf node to route the first LWM2M network packet to the constrained leaf node.

20. The wireless sensor network node of claim 17, wherein using the network layer to route the first LWM2M network packet includes using the destination IP address as a destination address to route the first LWM2M network packet to the leaf node.

21. The wireless sensor network node of claim 17, the LWM2M application layer gateway further configured for:
receiving a second LWM2M network packet from the constrained leaf node;

converting a partial application layer message in the second LWM2M network packet into a full application layer message; and setting a source IP address in the second LWM2M network packet to a virtual IP address assigned to the constrained leaf node.

22. A wireless sensor network node comprising:

a memory for storing data; and a processor operable to execute instructions associated with the data, wherein the processor and the memory cooperate such that a protocol abstraction layer for integrating a Lightweight Machine-to-Machine (LWM2M) application layer with a media access control (MAC) layer is configured for:
  serializing an application layer message from the LWM2M application for the MAC layer; and
  de-serializing a MAC layer message from the MAC layer for the LWM2M application layer.

* * * * *